(12) United States Patent
Noda

(10) Patent No.: US 7,085,068 B2
(45) Date of Patent: Aug. 1, 2006

(54) TWO-GROUP ZOOM LENS

(75) Inventor: Takayuki Noda, Saitama (JP)

(73) Assignee: Fujinon Corporation, Saitama (JP)

(*) Notice: Subject to any disclaimer, the term of this patent is extended or adjusted under 35 U.S.C. 154(b) by 197 days.

(21) Appl. No.: 10/933,316

(22) Filed: Sep. 3, 2004

(65) Prior Publication Data

US 2005/0024739 A1    Feb. 3, 2005

Related U.S. Application Data

(62) Division of application No. 10/377,702, filed on Mar. 4, 2003, now Pat. No. 6,995,925.

(30) Foreign Application Priority Data

Mar. 14, 2002 (JP) ............................. 2002-069839

(51) Int. Cl.
*G02B 15/14* (2006.01)
(52) U.S. Cl. ............... 359/684; 359/682; 359/691
(58) Field of Classification Search ............... 359/682, 359/684, 691, 692
See application file for complete search history.

(56) References Cited

U.S. PATENT DOCUMENTS

| | | |
|---|---|---|
| 5,283,693 A | 2/1994 | Kohno et al. |
| 5,446,592 A | 8/1995 | Kohno et al. |
| 5,872,660 A | 2/1999 | Kohno et al. |
| 6,025,961 A | 2/2000 | Kohno et al. |
| 6,124,987 A * | 9/2000 | Kayanuma et al. ......... 359/692 |
| 6,229,655 B1 | 5/2001 | Kohno et al. |
| 6,456,443 B1 | 9/2002 | Kohno et al. |

FOREIGN PATENT DOCUMENTS

| | | |
|---|---|---|
| JP | H10-232350 | 9/1998 |
| JP | 2001-21806 | 1/2001 |
| JP | 2001-100098 | 4/2001 |

* cited by examiner

*Primary Examiner*—Scott J. Sugarman
(74) *Attorney, Agent, or Firm*—Arnold International; Jon W. Henry; Bruce Y. Arnold

(57) ABSTRACT

A two-group zoom lens includes, in order from the object side, a first lens group that includes a negative lens component formed of a negative plastic lens element having at least one aspheric lens surface and a positive lens component, and a second lens group that includes a diaphragm, a positive lens component that is formed of a positive plastic lens element having at least one aspheric lens surface, and a negative lens doublet component. The first lens group and at least a part of the second lens group is movable along the optical axis for zooming, and either the first lens group or a lens component of the second lens group moves independently of the other lens components of the second lens group for focusing. Except for the negative lens doublet component, each lens component may be a lens element. The lens components and lens elements satisfy certain conditions.

10 Claims, 17 Drawing Sheets

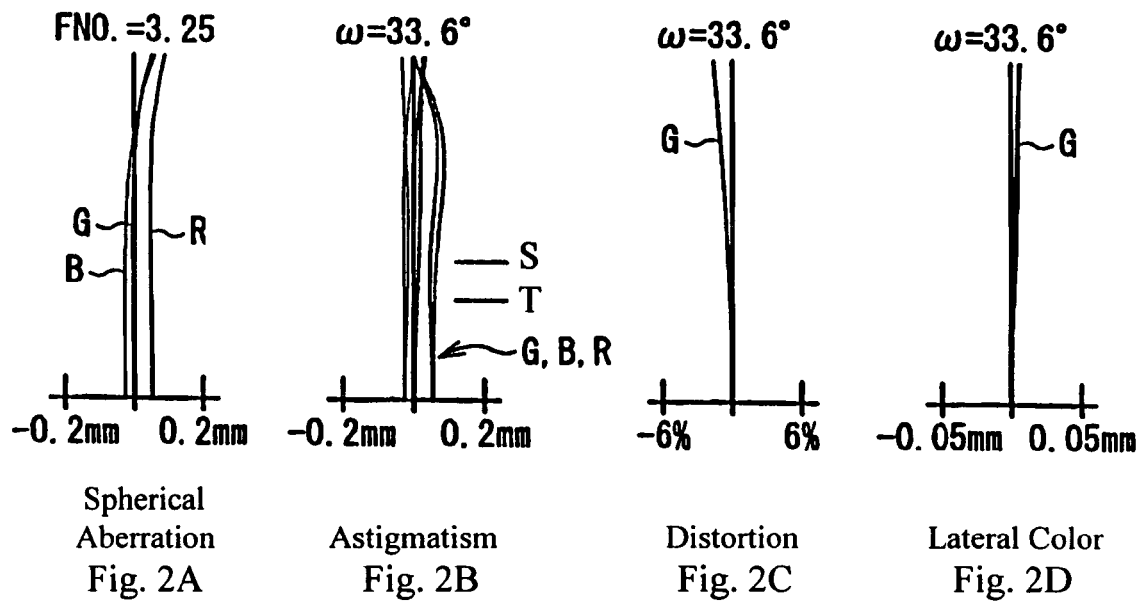
Spherical Aberration
Fig. 2A
Astigmatism
Fig. 2B
Distortion
Fig. 2C
Lateral Color
Fig. 2D
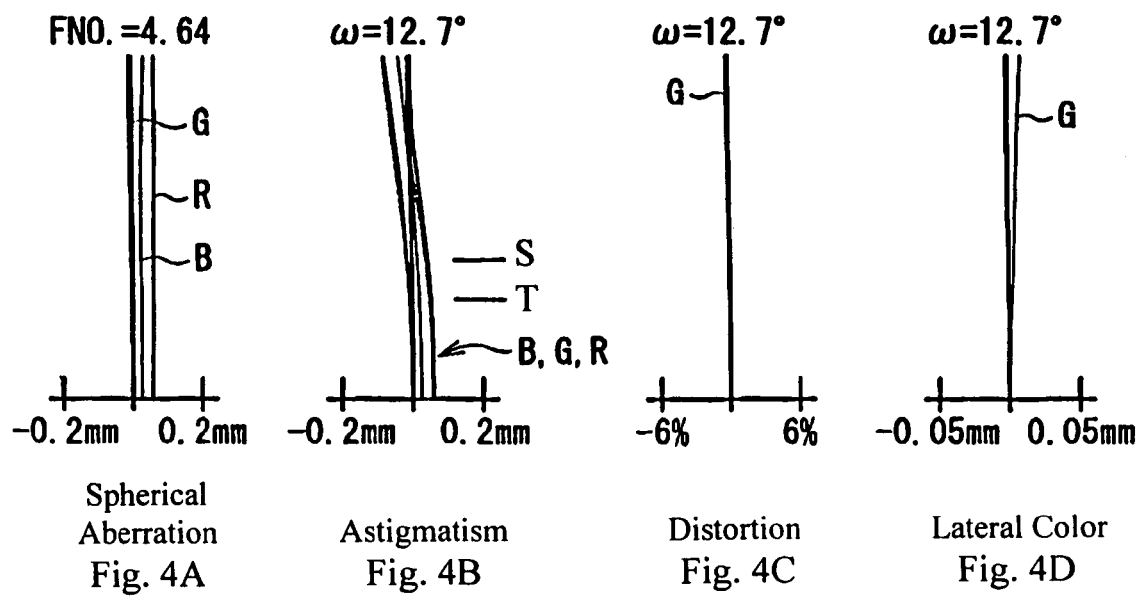
Spherical Aberration
Fig. 4A
Astigmatism
Fig. 4B
Distortion
Fig. 4C
Lateral Color
Fig. 4D

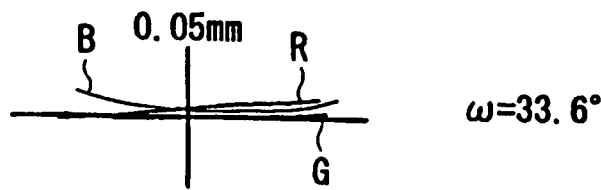
ω=33.6°  Fig. 3A
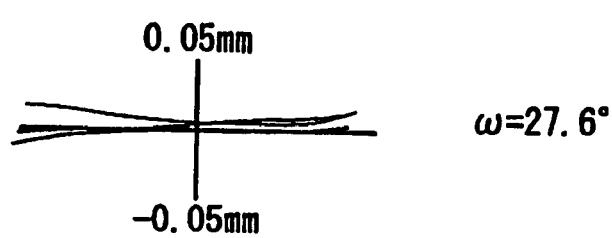
ω=27.6°  Fig. 3B
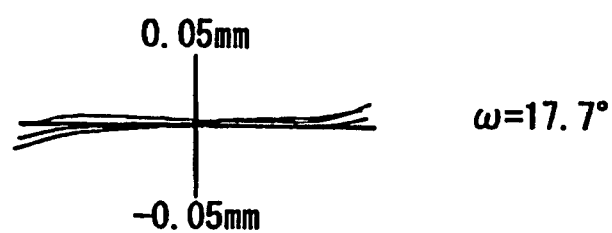
ω=17.7°  Fig. 3C
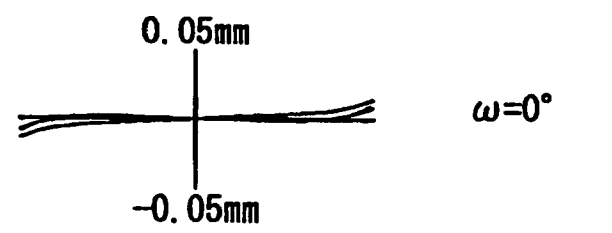
ω=0°  Fig. 3D
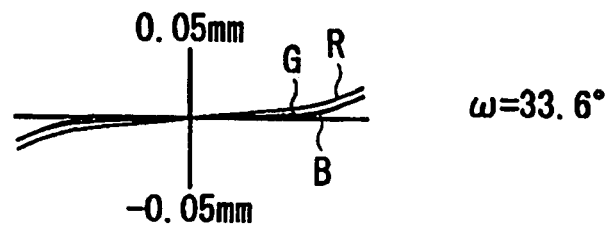
ω=33.6°  Fig. 3E
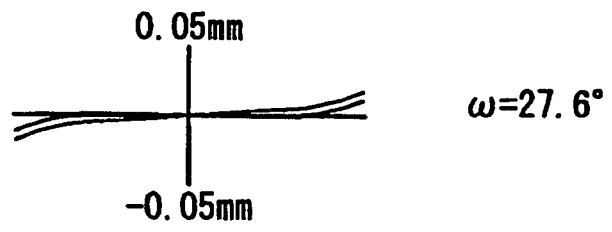
ω=27.6°  Fig. 3F
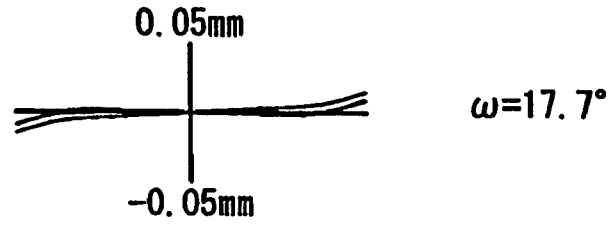
ω=17.7°  Fig. 3G

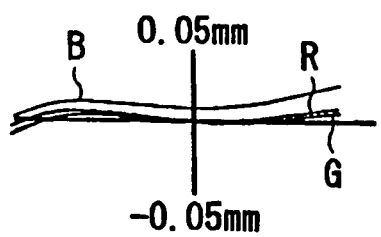
ω=12.7°  Fig. 5A
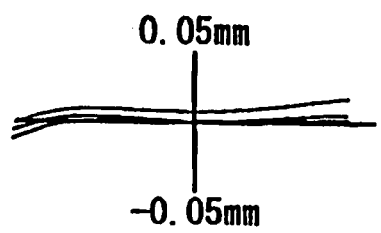
ω=10.2°  Fig. 5B
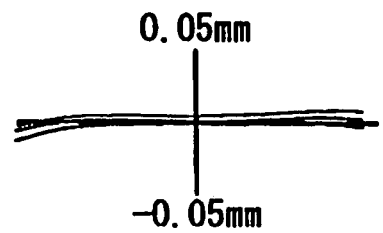
ω=6.4°  Fig. 5C
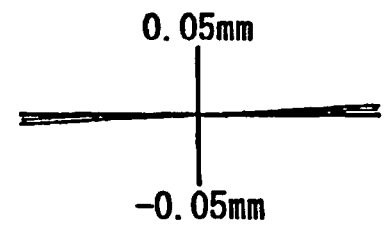
ω=0°  Fig. 5D
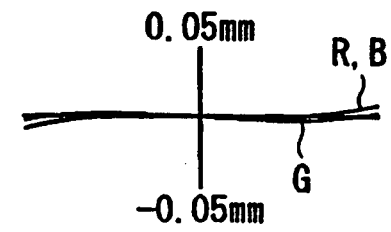
ω=12.7°  Fig. 5E
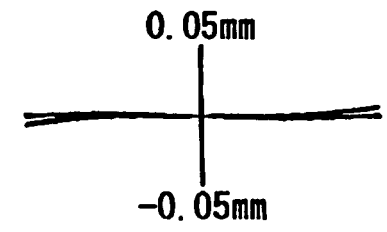
ω=10.2°  Fig. 5F
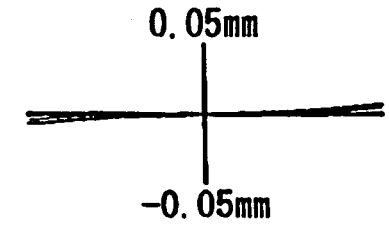
ω=6.4°  Fig. 5G

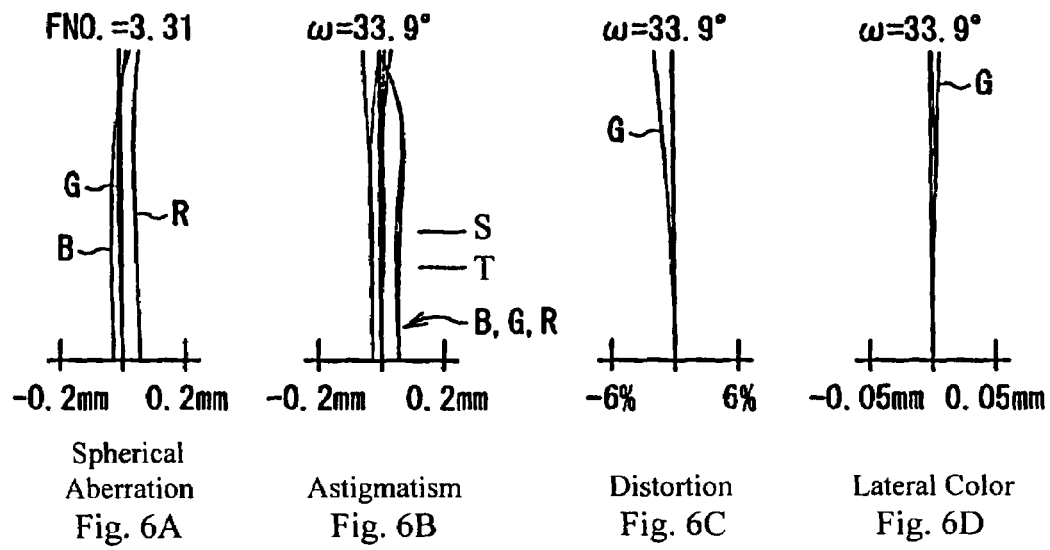
Spherical Aberration
Fig. 6A
Astigmatism
Fig. 6B
Distortion
Fig. 6C
Lateral Color
Fig. 6D
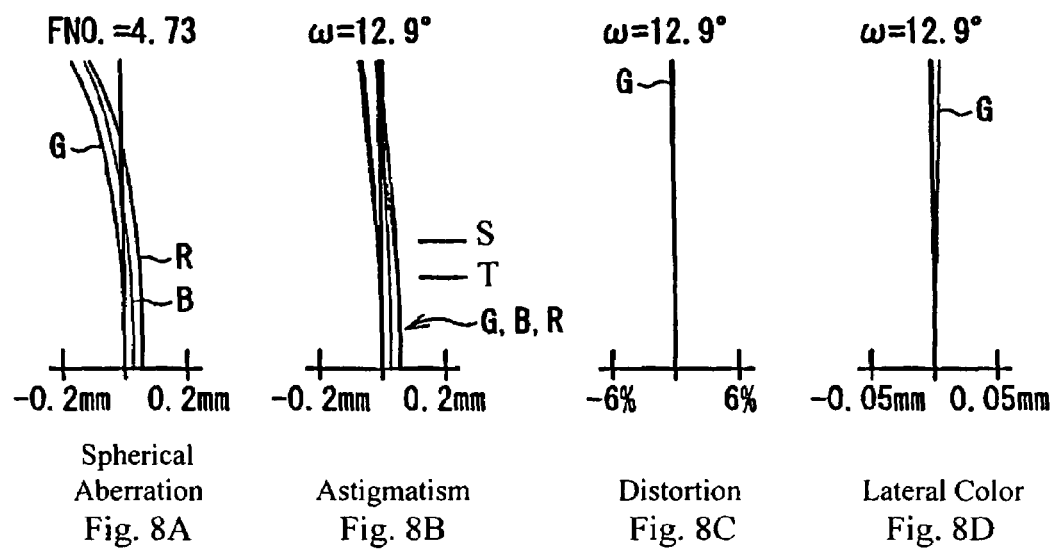
Spherical Aberration
Fig. 8A
Astigmatism
Fig. 8B
Distortion
Fig. 8C
Lateral Color
Fig. 8D

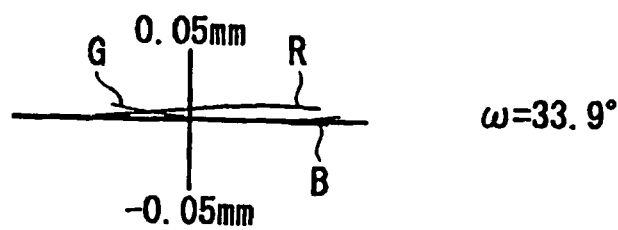
ω=33.9°  Fig. 7A
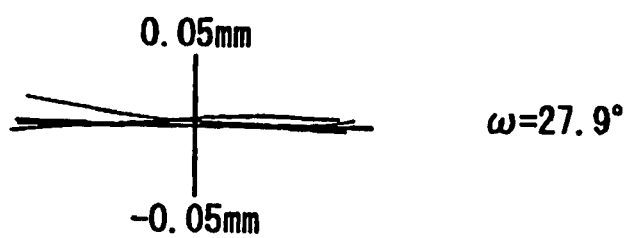
ω=27.9°  Fig. 7B
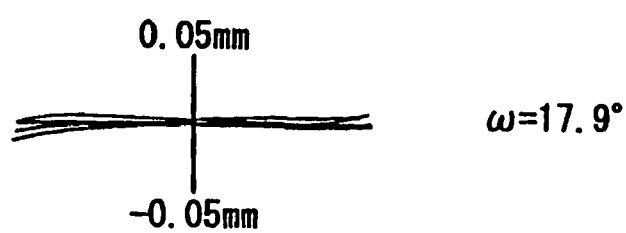
ω=17.9°  Fig. 7C
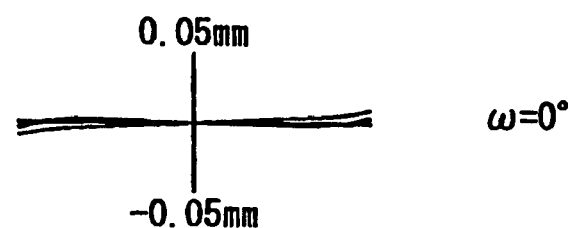
ω=0°  Fig. 7D
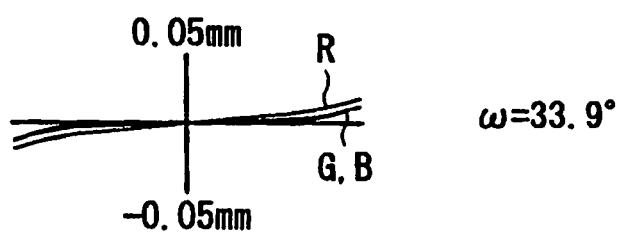
ω=33.9°  Fig. 7E
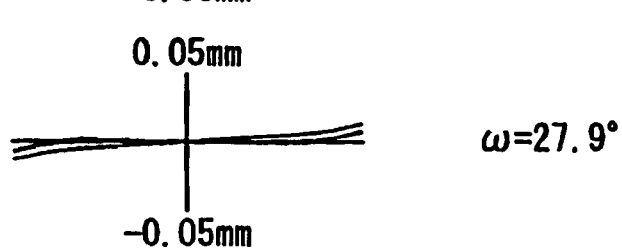
ω=27.9°  Fig. 7F
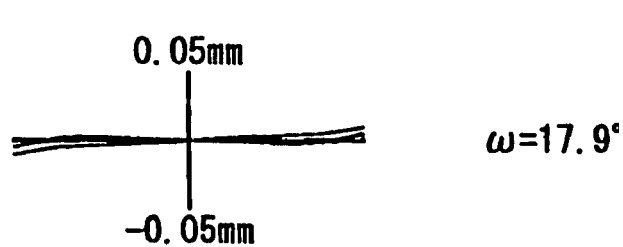
ω=17.9°  Fig. 7G

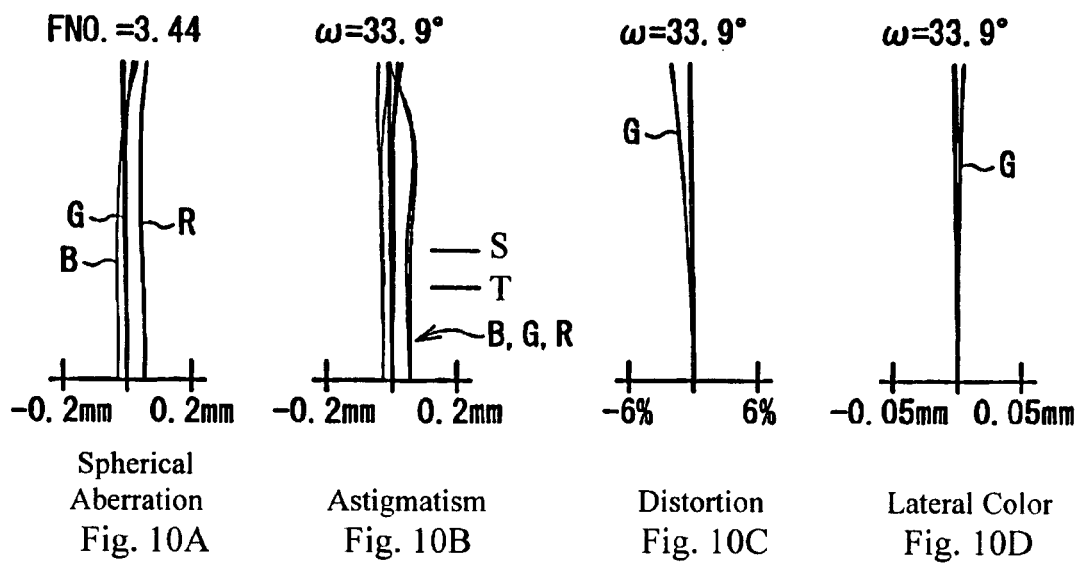
Fig. 10A Spherical Aberration
Fig. 10B Astigmatism
Fig. 10C Distortion
Fig. 10D Lateral Color
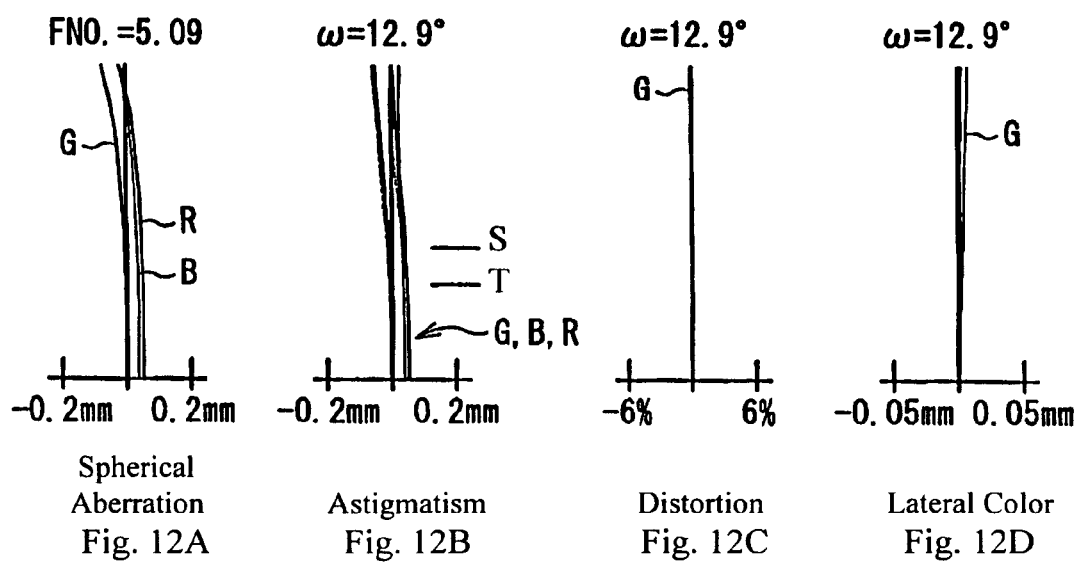
Fig. 12A Spherical Aberration
Fig. 12B Astigmatism
Fig. 12C Distortion
Fig. 12D Lateral Color

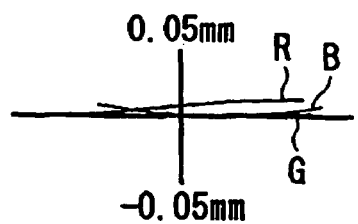
ω=33.9°  Fig. 11A
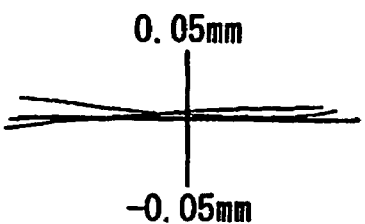
ω=27.8°  Fig. 11B
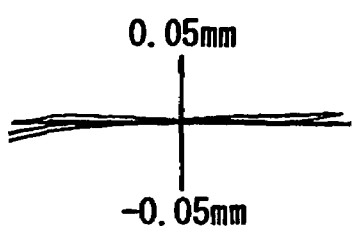
ω=17.9°  Fig. 11C
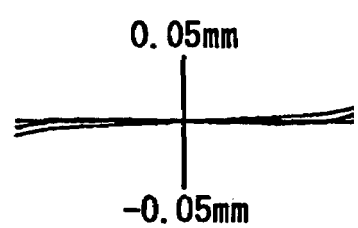
ω=0°  Fig. 11D
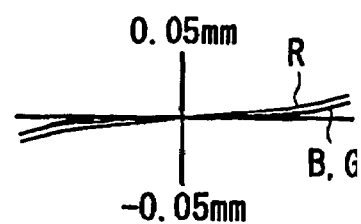
ω=33.9°  Fig. 11E
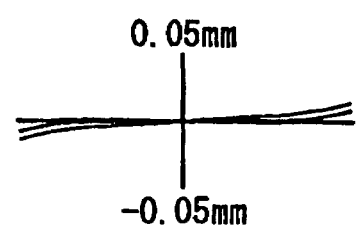
ω=27.8°  Fig. 11F
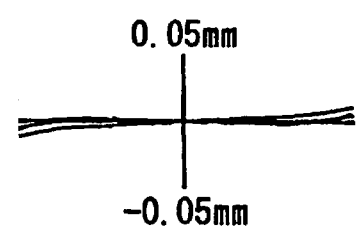
ω=17.9°  Fig. 11G

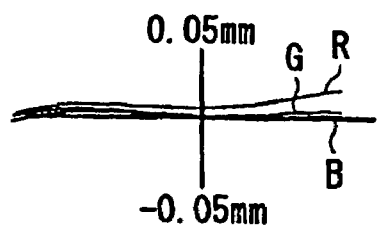
$\omega=12.9°$  Fig. 13A
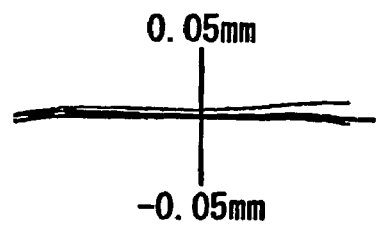
$\omega=10.3°$  Fig. 13B
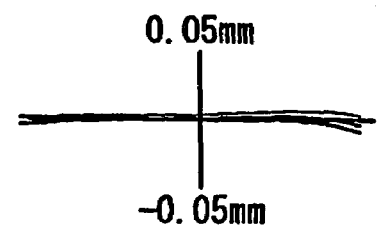
$\omega=6.5°$  Fig. 13C
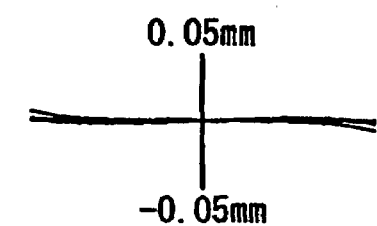
$\omega=0°$  Fig. 13D
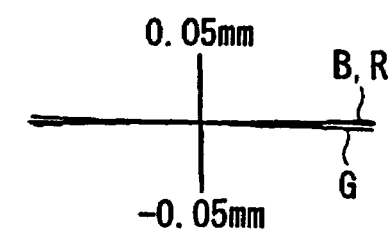
$\omega=12.9°$  Fig. 13E
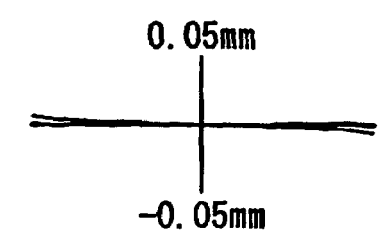
$\omega=10.3°$  Fig. 13F
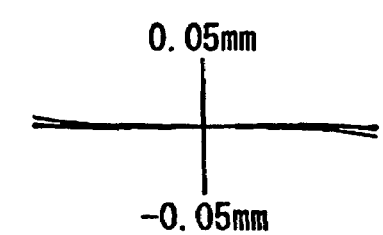
$\omega=6.5°$  Fig. 13G

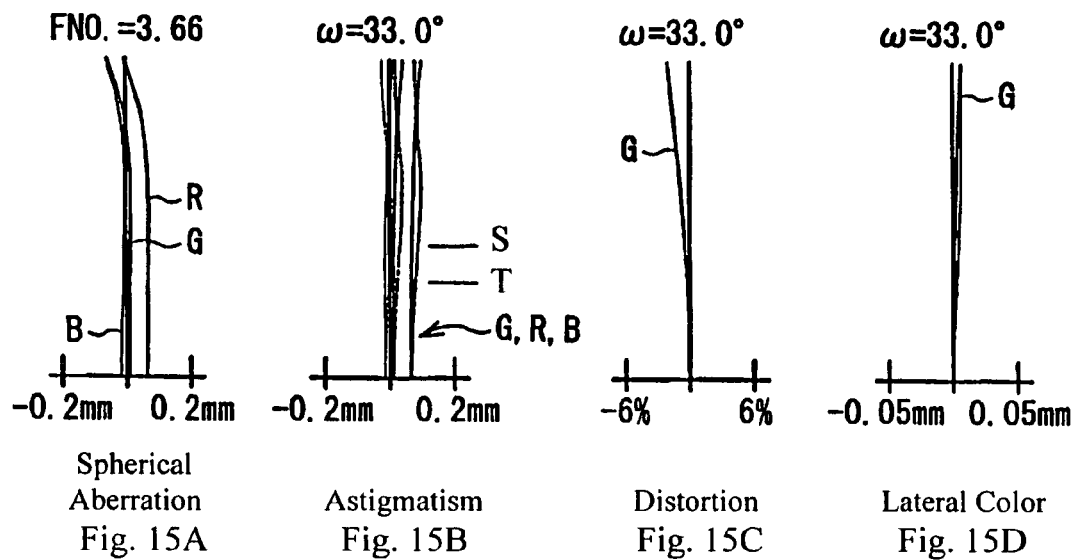
Spherical Aberration
Fig. 15A
Astigmatism
Fig. 15B
Distortion
Fig. 15C
Lateral Color
Fig. 15D
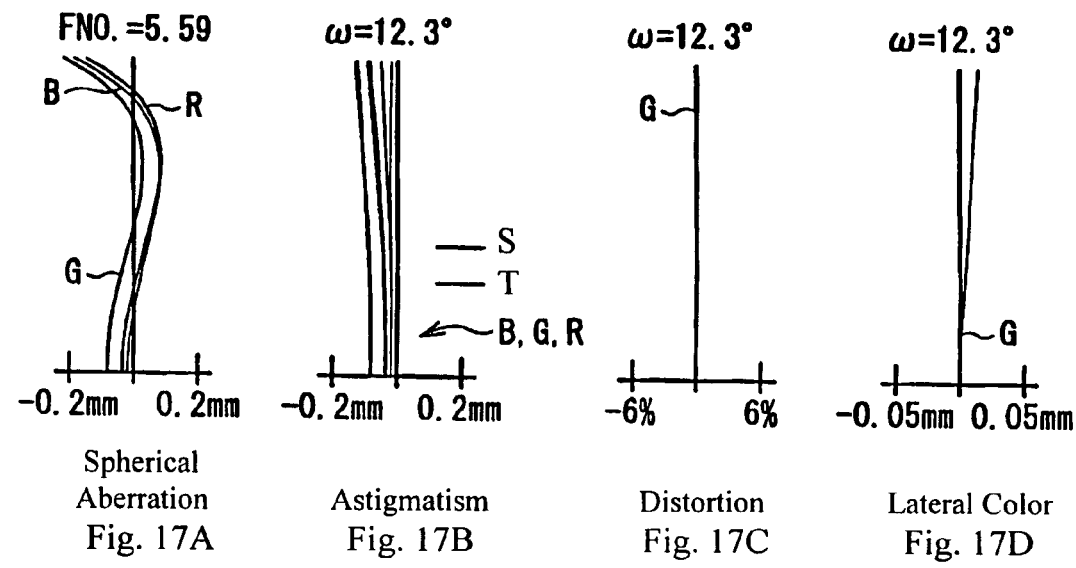
Spherical Aberration
Fig. 17A
Astigmatism
Fig. 17B
Distortion
Fig. 17C
Lateral Color
Fig. 17D

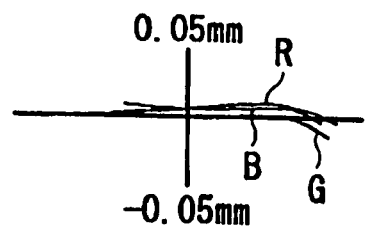
ω=33.0°  Fig. 16A
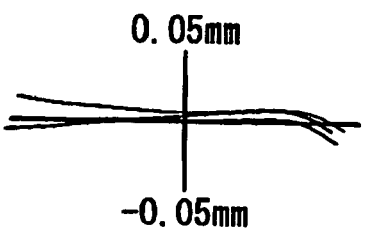
ω=27.0°  Fig. 16B
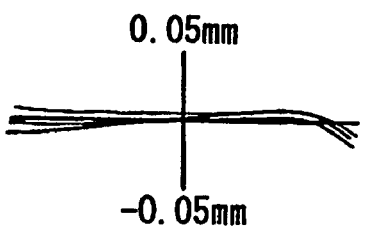
ω=17.2°  Fig. 16C
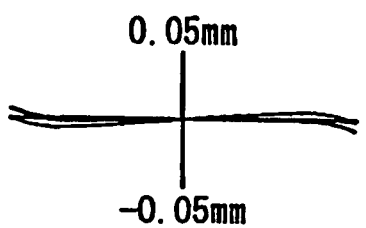
ω=0°  Fig. 16D
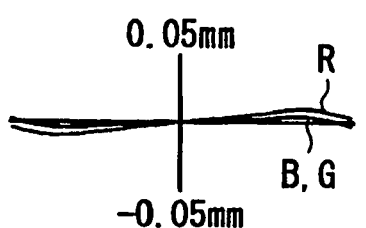
ω=33.0°  Fig. 16E
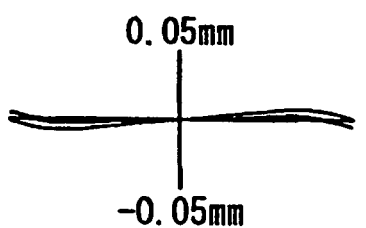
ω=27.0°  Fig. 16F
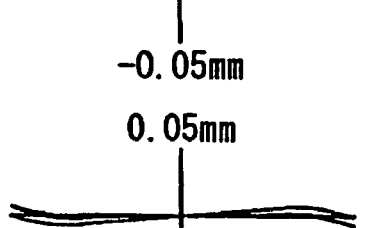
ω=17.2°  Fig. 16G

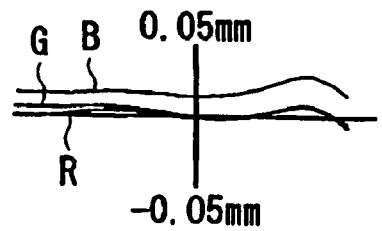
ω=12.3°  Fig. 18A
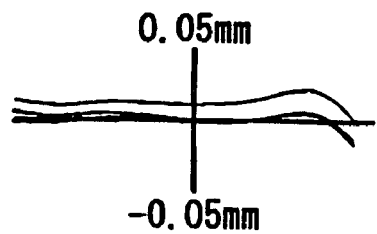
ω=9.9°  Fig. 18B
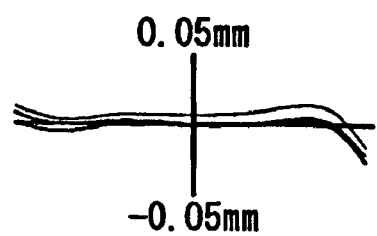
ω=6.2°  Fig. 18C
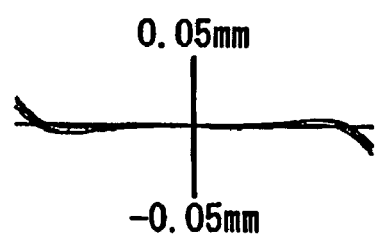
ω=0°  Fig. 18D
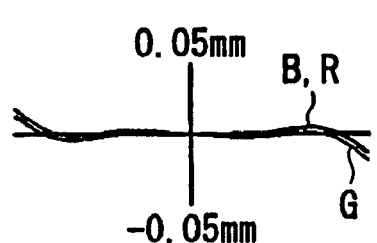
ω=12.3°  Fig. 18E
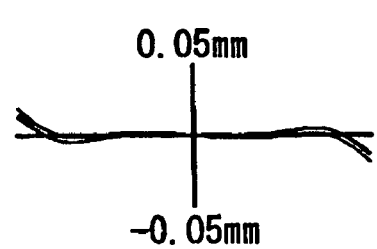
ω=9.9°  Fig. 18F
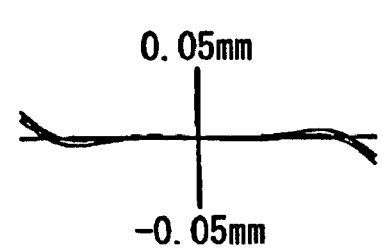
ω=6.2°  Fig. 18G

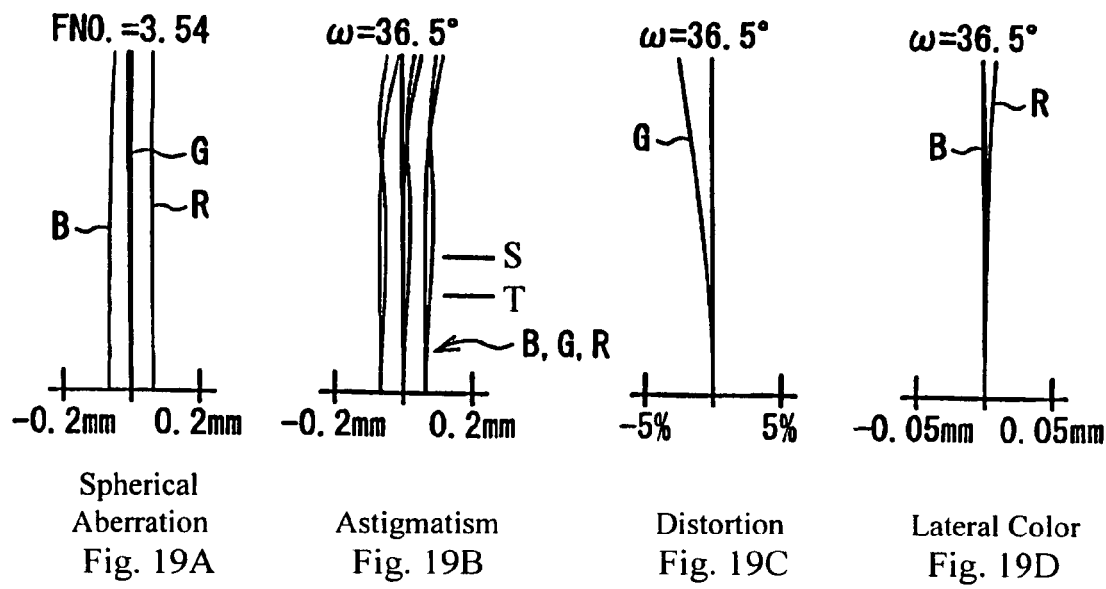
Spherical Aberration
Fig. 19A
Astigmatism
Fig. 19B
Distortion
Fig. 19C
Lateral Color
Fig. 19D
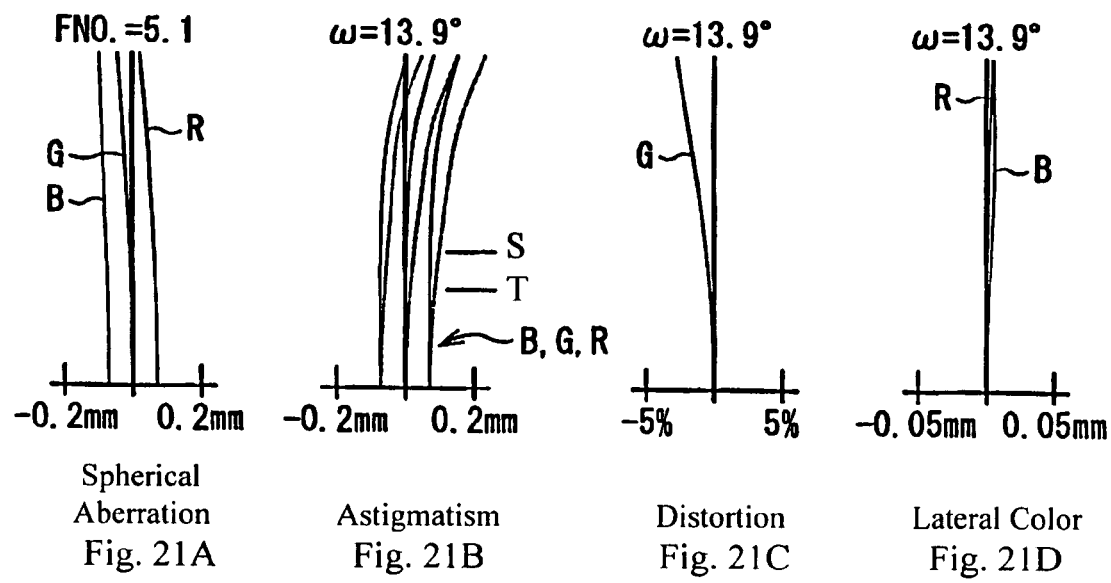
Spherical Aberration
Fig. 21A
Astigmatism
Fig. 21B
Distortion
Fig. 21C
Lateral Color
Fig. 21D

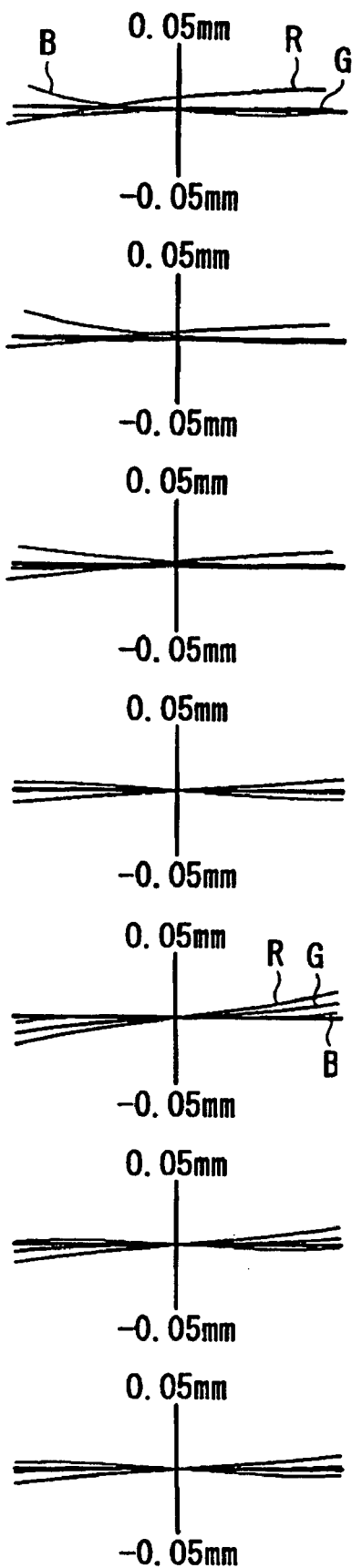
Fig. 20A ω=36.5°
Fig. 20B ω=30.1°
Fig. 20C ω=23.0°
Fig. 20D ω=0°
Fig. 20E ω=36.5°
Fig. 20F ω=30.1°
Fig. 20G ω=23.0°

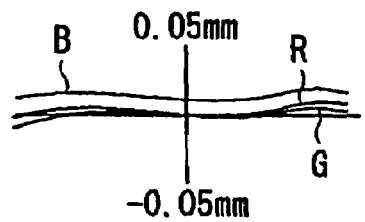
ω=13.9°  Fig. 22A
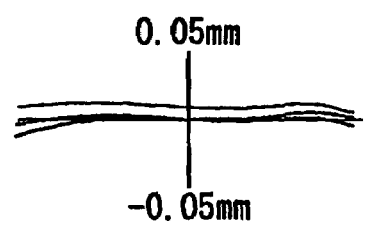
ω=11.1°  Fig. 22B
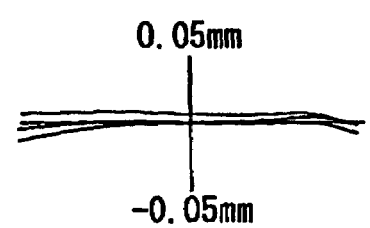
ω=8.4°  Fig. 22C
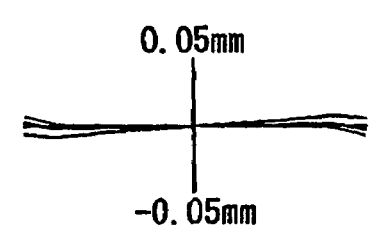
ω=0°  Fig. 22D
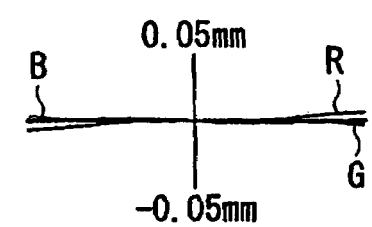
ω=13.9°  Fig. 22E
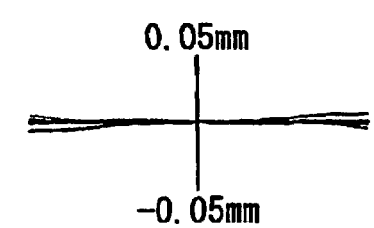
ω=11.1°  Fig. 22F
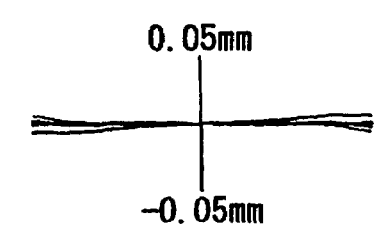
ω=8.4°  Fig. 22G

TWO-GROUP ZOOM LENS

This is a divisional application of U.S. application Ser. No. 10/377,702 filed Mar. 4, 2003, now U.S. Pat. No. 6,995,925 the benefit of priority of which is hereby claimed under 35 U.S.C. § 120.

BACKGROUND OF THE INVENTION

Imaging devices, such as digital still cameras (hereinafter termed simply digital cameras) and surveillance TV cameras, conventionally use image detecting elements such as CCD (Charge Coupled Device) and CMOS (Complementary Metal Oxide Semiconductor) image detecting elements. In general, these imaging devices are required to have high image quality, including high resolution, and a compact configuration. Such performance demands that the imaging lens itself, which is mounted in each such device, be compact even when a zoom lens is used. Additionally, a so-called low-pass filter is often placed between a zoom lens and the image plane in order to reduce the high spatial frequency components of the object light for imaging. Therefore, an appropriately long back focus is needed to provide room for such a low-pass filter.

Simple zoom lenses conventionally use two lens groups. Examples of two-group zoom lenses are disclosed in Japanese Laid-Open Patent Applications H09-258103, H10-232350, H11-142734, 2000-9997, 2000-267009, 2001-21806, and 2001-100098, and Japanese Patents 3033138 and 3033149. The zoom lenses disclosed in these publications do not adequately achieve the small size and high image quality desired. For example, the zoom lenses disclosed in Japanese Laid-Open Patent Applications 2000-267009 and 2001-100098 use a relatively large number of lens elements. This tends to make the lenses too large and too complex. Furthermore, few of these publications discuss how focusing is achieved. However, image quality varies with focusing changes and the manner in which focusing is achieved, and therefore the design of the zoom lenses should consider those factors. However, that has not been properly done in the cited prior art.

BRIEF SUMMARY OF THE INVENTION

The present invention is a two-group zoom lens that includes aspheric plastic lens elements and that is suitable as the imaging lens for a small imaging device, such as a digital camera or a surveillance television camera.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 2A–2D show the spherical aberration, astigmatism, distortion, and lateral color, respectively, of the zoom lens according to Embodiment 1 at the wide-angle end;

FIGS. 3A–3D show the coma at various field angles in the tangential plane, and FIGS. 3E–3G show the coma at various field angles in the sagittal plane, of the zoom lens according to Embodiment 1 at the wide-angle end;

FIGS. 4A–4D show the spherical aberration, astigmatism, distortion, and lateral color, respectively, of the zoom lens according to Embodiment 1 at the telephoto end;

FIGS. 5A–5D show the coma at various field angles in the tangential plane, and FIGS. 5E–5G show the coma at various field angles in the sagittal plane, of the zoom lens according to Embodiment 1 at the telephoto end;

FIGS. 6A–6D show the spherical aberration, astigmatism, distortion, and lateral color, respectively, of the zoom lens according to Embodiment 2 at the wide-angle end;

FIGS. 7A–7D show the coma at various field angles in the tangential plane, and FIGS. 7E–7G show the coma at various field angles in the sagittal plane, of the zoom lens according to Embodiment 2 at the wide-angle end;

FIGS. 8A–8D show the spherical aberration, astigmatism, distortion, and lateral color, respectively, of the zoom lens according to Embodiment 2 at the telephoto end;

FIGS. 10A–10D show the spherical aberration, astigmatism, distortion, and lateral color, respectively, of the zoom lens according to Embodiment 3 at the wide-angle end;

FIGS. 11A–11D show the coma at various field angles in the tangential plane, and FIGS. 11E–11G show the coma at various field angles in the sagittal plane, of the zoom lens according to Embodiment 3 at the wide-angle end;

FIGS. 12A–12D show the spherical aberration, astigmatism, distortion, and lateral color, respectively, of the zoom lens according to Embodiment 3 at the telephoto end;

FIGS. 13A–13D show the coma at various field angles in the tangential plane, and FIGS. 13E–13G show the coma at various field angles in the sagittal plane, of the zoom lens according to Embodiment 3 at the telephoto end;

FIGS. 15A–15D show the spherical aberration, astigmatism, distortion, and lateral color, respectively, of the zoom lens according to Embodiment 4 at the wide-angle end;

FIGS. 16A–16D show the coma at various field angles in the tangential plane, and FIGS. 16E–16G show the coma at various field angles in the sagittal plane, of the zoom lens according to Embodiment 4 at the wide-angle end;

FIGS. 17A–17D show the spherical aberration, astigmatism, distortion, and lateral color, respectively, of the zoom lens according to Embodiment 4 at the telephoto end;

FIGS. 18A–18D show the coma at various field angles in the tangential plane, and FIGS. 18E–18G show the coma at various field angles in the sagittal plane, of the zoom lens according to Embodiment 4 at the telephoto end;

FIGS. 19A–19D show the spherical aberration, astigmatism, distortion, and lateral color, respectively, of the zoom lens according to Embodiment 5 at the wide-angle end;

FIGS. 20A–20D show the coma at various field angles in the tangential plane, and FIGS. 20E–20G show the coma at various field angles in the sagittal plane, of the zoom lens according to Embodiment 5 at the wide-angle end;

FIGS. 21A–21D show the spherical aberration, astigmatism, distortion, and lateral color, respectively, of the zoom lens according to Embodiment 5 at the telephoto end; and FIGS. 22A–22D show the coma at various field angles in the tangential plane, and FIGS. 22E–22G show the coma at various field angles in the sagittal plane, of the zoom lens according to Embodiment 5 at the telephoto end.

DETAILED DESCRIPTION

First, definitions of the terms "lens element," "lens component," and "lens group," that relate to the following detailed description will be given. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Additionally, as used herein, the term "negative" preceding a lens element, lens component, or lens group means that the lens element, lens component, or lens group (as a whole) has a negative refractive power. Similarly, as used herein, the term "positive" preceding a lens element, lens component, or lens group means that the lens element, lens component, or lens group (as a whole) has a positive refractive power.

Figure 1A:
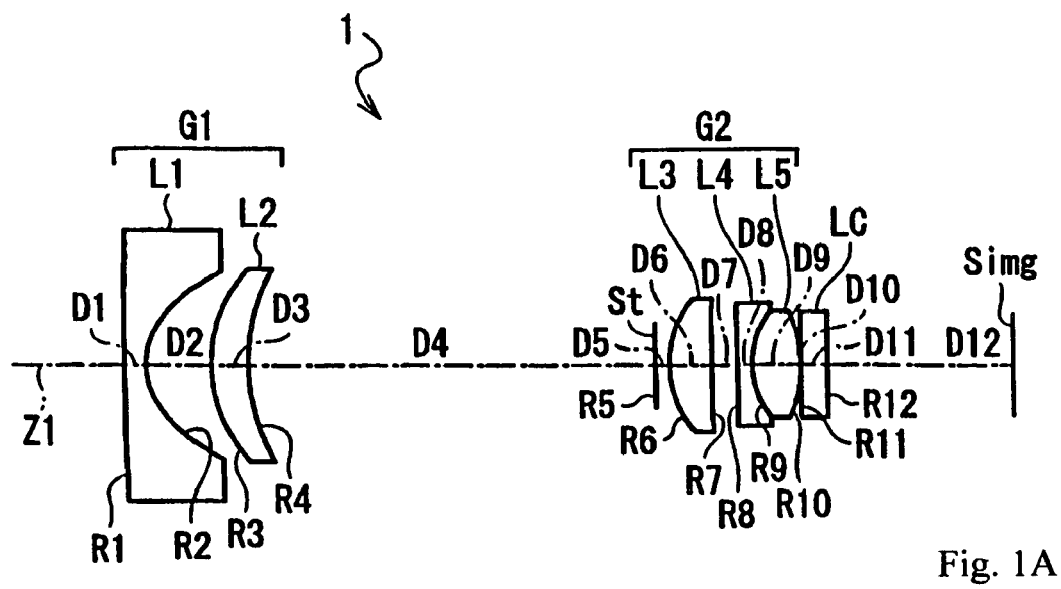
FIGS. 1A, 1B, and 1C show cross-sectional views of the zoom lens according to Embodiment 1 at the wide-angle end, at an intermediate position, and at the telephoto end, respectively.
Figure 1B:
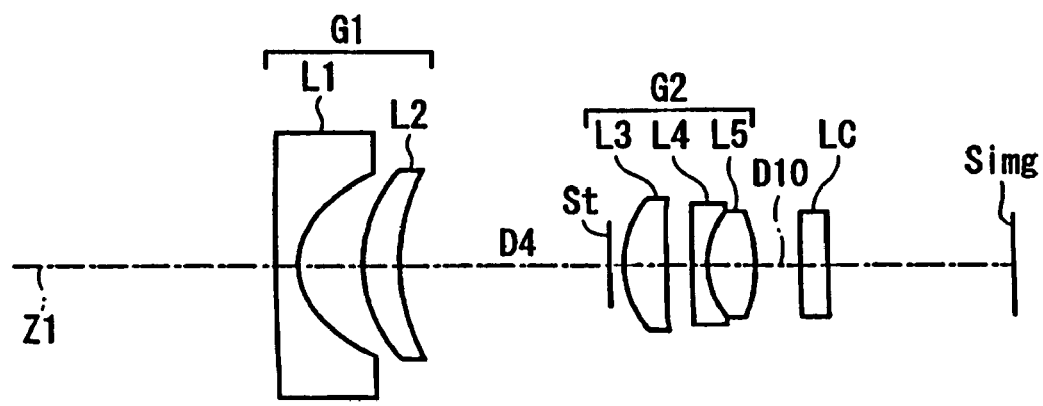
Figure 1C:
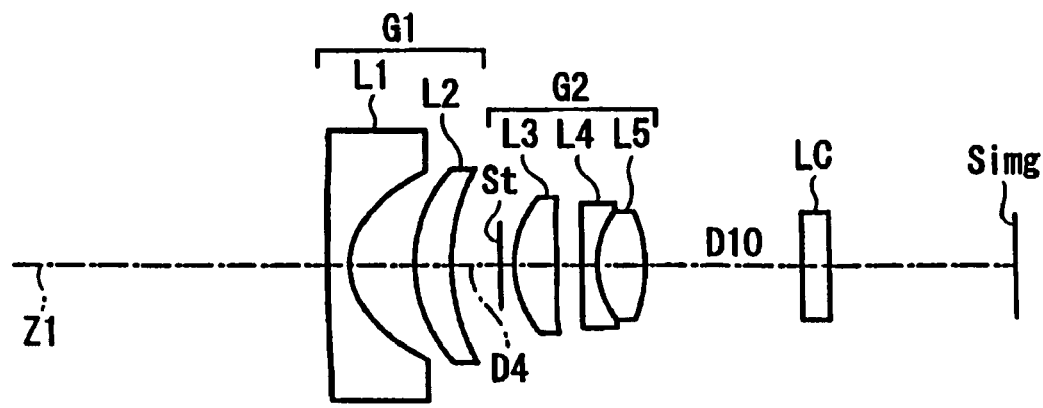

A general description of the preferred embodiments of the zoom lens of the present invention will now be described with reference to FIGS. 1A–1C that shows Embodiment 1. In FIGS. 1A–1C, lens groups are referenced by the letter G followed by a number denoting their order from the object side of the zoom lens, from G1 to G2, and lens elements are referenced by the letter L followed by a number denoting their order from the object side of the zoom lens, from L1 to L5 for Embodiments 1–3 that follow, and L1 to L6 for Embodiments 4 and 5 that follow, with LC denoting an optical element such as a low pass filter without optical power. Similarly, the radii of curvature of the optical surfaces of all the optical elements, including the lens surfaces and a diaphragm that may serve as an aperture stop St, are referenced by the letter R followed by a number denoting their order from the object side of the zoom lens, from R1 to R12 for Embodiments 1–3 that follow and R1 to R14 for Embodiments 4 and 5 that follow. The on-axis surface spacings (along the optical axis Z1 in FIGS. 1A and 14A) of all the optical element surfaces are referenced by the letter D followed by a number denoting their order from the object side of the zoom lens, from D1 to D12 for Embodiments 1–3 that follow and D1 to D14 for Embodiments 4 and 5 that follow.

With regard to the definitions of "lens component" and "lens elements" above, in the five preferred embodiments of the zoom lens of the present invention described below, lens elements L1, L2, and L3 are all the first, second, and third lens components, respectively, in order from the object side, and lens elements L4 and L5 form a lens doublet component that is the fourth lens component from the object side. The present invention may variously be described in terms of lens elements or in terms of lens components. The use of these terms in describing preferred embodiments of the invention should not be taken to limit the scope of the invention to these preferred embodiments. For example, if certain conditions satisfied by preferred embodiments of the invention are described in terms of features of lens elements that are also lens components, these conditions may also be described in terms of lens components as appropriate. One skilled in the art will recognize from the descriptions that follow when lens elements are also lens components and when lens components include more than one lens element based on the definitions of the terms "lens element" and "lens component" above.

The zoom lens of the present invention is particularly desirably designed for mounting in compact imaging devices such as digital cameras, photographic film cameras, and surveillance TV cameras. As shown in FIGS. 1A–1C, the diaphragm that may serve as an aperture stop St is installed in the zoom lens 1 between the first lens group G1 and the second lens group G2. An image detecting element, such as a CCD or CMOS image detecting element is placed at an image forming plane, denoted as Simg in FIGS. 1A–1C. A cover glass for protecting the imaging surface may be placed near the image forming plane.

Both lens groups G1 and G2 include at least one lens element with an aspheric lens surface. The use of aspheric lens surfaces makes it easier to correct various aberrations while still achieving compactness of the zoom lens.

Those surfaces that are aspheric lens surfaces satisfy the following equation:

$$Z=[(Y^2/R)/\{1+(1-K\cdot Y^2/R^2)^{1/2}\}]+A_4Y^4+A_6Y^6+A_8Y^8+A_{10}Y^{10} \quad \text{(Equation A)}$$

where

Z is the length (in mm) of a line drawn from a point on the aspheric lens surface at a distance Y from the optical axis to the tangential plane of the aspherical surface vertex, R is the radius of curvature of the aspheric lens surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

Additionally, it is desirable that the lens elements that include aspheric lens surfaces are made of synthetic resin, that is, plastic. Making the lens elements with aspheric lens surfaces of plastic provides advantages in manufacturing and processing, and reduces the weight of the zoom lens.

Zoom lenses of the present invention are small and satisfactorily correct aberrations and enable small, light weight, low cost imaging devices with high resolution. Particularly, even with the first and third lens elements, L1 and L3, being made of plastic (i.e., synthetic resin), small Petzval sums and reduced distortions are achieved. In addition, the entire length of the zoom lens is reduced while maintaining a relatively low sensitivity to decentering of the optical elements of the zoom lens.

Five preferred embodiments of the zoom lens of the present invention will now be individually described with reference to the drawings.

EMBODIMENT 1

FIGS. 1A–1C show the basic lens element configurations of a zoom lens of Embodiment 1 of the present invention at the wide-angle end, at an intermediate position, and at the telephoto end, respectively. The same basic lens element configurations are used in the zoom lenses of Embodiments 1–3 of the present invention.

The zoom lens 1 according to the embodiment shown in FIGS. 1A–1C is suitable for use in small-sized imaging apparatuses such as digital cameras. The zoom lens 1 includes, in order from the object side, a first lens group G1 and a second lens group G2 along the optical axis Z1. An imaging element (not shown), such as a CCD or CMOS, is positioned on the image plane Simg of the zoom lens 1. A cover glass (not shown) for protecting the image plane and one or more optical elements denoted by LC in FIGS. 1A–1C, such as a low-pass filter, are provided between the second lens group G2 and the image plane Simg.

The first and second lens groups G1 and G2 of the zoom lens 1 move along the optical axis for zooming. The zoom lens 1 is of the front-focusing type so that the first lens group G1 moves along the optical axis for focusing according to the change in object distance.

The first lens group G1 includes, in order from the object side, a first lens element L1 and a second lens element L2. The first lens element L1 is also the first lens component, from the object side, of the zoom lens 1, and the second lens element L2 is also the second lens component, from the object side, of the zoom lens 1. The second lens group G2 includes, in order from the object side, a diaphragm that may serve as an aperture stop St, a third lens element L3, a fourth lens element L4, and a fifth lens element L5. The first lens L1 is a negative lens element made of plastic with two aspheric lens surfaces and with a concave lens surface on its image side. The second lens element L2 is a positive meniscus lens element with a convex lens surface on its object side. The third lens element L3 is a biconvex lens element made of plastic with two aspheric lens surfaces. The third lens element L3 is also the third lens component, from the object side, of the zoom lens 1. The fourth lens element L4 is a negative lens element with a concave lens surface on its image side. The fifth lens element L5 forms a doublet together with the fourth lens L4. The fifth lens L5 is a biconvex lens. The fourth lens element L4 and the fifth lens element L5 together form the fourth lens component, from the object side, of the zoom lens 1.

Preferably, both lens surfaces of both of the first and third lens elements L1 and L3 are aspheric lens surfaces. Preferably also, the absolute value of the radius of curvature of the lens surface of the fourth lens element L4 that is on the object side is smaller than the absolute value of the radius of curvature of the lens surface of the fourth lens element L4 that is on the image side, and, with this configuration, preferably the first and third lens elements include a total of at least three aspheric lens surfaces of their four total lens surfaces.

Further, preferably the following condition is satisfied:

$60 < f(4-5)/fw < 500$  Condition (1)

where f(4–5) is the composite focal length of the fourth lens element L4 and the fifth lens element L5 of the zoom lens, and fw is the focal length of the zoom lens at the wide-angle end.

Condition (1) is mainly a condition for accurately correcting chromatic aberration and distortion at the wide-angle end of the zoom lens.

Additionally, preferably the following condition is satisfied:

$2.2 < f(3-5)/fw < 2.7$  Condition (2)

where f(3–5) is the composite focal length of the third lens element L3, the fourth lens element L4, and the fifth lens element L5, and fw is as defined above.

Condition (2) defines an appropriate range of the focal length, f(3–5) of the rear lens group, i.e., the second lens group G2. By satisfying Condition (2), field curvature and distortion are well balanced and the back focus is reduced, leading to a reduction in the entire length of the zoom lens. If the above ratio of Condition (2) is smaller than the lower limit of Condition (2), field curvature and distortion are not properly corrected. If the above ratio of Condition (2) is larger than the upper limit of Condition (2), the back focus becomes too large, leading to an increase in the entire length of the zoom lens.

Further, preferably the following condition is satisfied:

$|f1/fw| < 1.74$  Condition (3)

where f1 is the focal length of the first lens element L1 of the zoom lens, and fw is as defined above.

By satisfying Condition (3), aberrations are favorably corrected, the back focus is easily increased, and the second lens group G2 may be made small. If the above ratio of Condition (3) is larger than the upper limit of Condition (3), it is difficult to make the second lens group G2 small.

Also, preferably the following condition is satisfied:

$|fw/R1| < 0.04$  Condition (4)

where fw is as defined above, and

R1 is the radius of curvature of the object-side lens surface of said first lens component.

Condition (4) defines an appropriate profile of the object side surface of the first lens element L1 that is a plastic lens element. For example, in order to reduce the lens length at the retracted position in the lens barrel, it is preferred that the first lens element L1 has a relatively flat surface, that is, a very large radius of curvature, on the object side. Condition (4) assures such a relatively large radius of curvature.

The zoom lens 1 has a lens element configuration that is advantageous with front focusing in spite of the small number of lens components and lens elements used in the zoom lens. In particular, with Conditions (2)–(4) being satisfied, the zoom lens facilitates the correction of aberrations and makes the zoom lens small. Front focusing is usually done by a front lens group that moves integrally along the optical axis and protrudes from the front of an imaging device. Front focusing is usually available by manual focusing, which is made easy by the fact that little movement of the front lens group is required. Because front focusing can be performed by movement of only the front lens group as one piece, zooming is simplified by, for example, eliminating the need for complex driving mechanisms such as a zooming cam. In addition, front focusing helps reduces variations in aberrations, which enables a smaller number of lens elements to be used.

In lens group G1 of the zoom lens 1, by making the relatively large first lens element L1 of plastic, the weight of the first lens group G1 that is moved for front focusing, as well as moved for zooming, is reduced, thus reducing the load on the driving mechanisms of the lens group G1. This allows for making the driving mechanism smaller and, accordingly, for making the entire zoom lens 1, including the driving mechanism, smaller.

The use of aspheric lens surfaces for the first and third lens elements, L1 and L3, that are made of plastic allows for a smaller zoom lens I that still well corrects aberrations. Even though light paths through the zoom lens vary to a large extent between the wide-angle and telephoto ends, the use of aspheric lens surfaces enables satisfactory correction of aberrations at the telephoto end and, in particular, satisfactory correction of distortion and field curvature at the wide-angle end. The use of plastic is especially advantageous for manufacturing and processing lenses with aspheric lens surfaces, as well as advantageous in reducing the weight of the zoom lens 1.

Table 1 below lists the surface number #, in order from the object side, the radius of curvature R (in mm) of each surface near the optical axis, the on-axis surface spacing D (in mm) between surfaces, as well as the refractive index $N_e$ (at the e-line of $\lambda=546.1$ nm) and the Abbe number $v_d$ (at the d-line of 587.6 nm) of each lens element for Embodiment 1. Listed in the bottom portion of Table 1 are the focal length f, the f-number $F_{NO}$, the zoom ratio Z at the wide-angle and telephoto ends, and the maximum image angle 2ω at the wide-angle end for Embodiment 1.

TABLE 1

| # | R | D | $N_e$ | $v_d$ |
|---|---|---|---|---|
| 1* (L1) | 564.000 | 1.40 | 1.51080 | 55.9 |
| 2* | 4.610 | 4.14 | | |
| 3 (L2) | 9.199 | 2.38 | 1.73430 | 28.3 |
| 4 | 13.480 | D4 (variable) | | |
| 5 (stop) | ∞ | 0.88 | | |
| 6* (L3) | 6.770 | 2.74 | 1.51080 | 55.9 |
| 7* | −55.200 | 1.57 | | |
| 8 (L4) | ∞ | 1.00 | 1.83932 | 37.1 |
| 9 (L5) | 5.800 | 3.07 | 1.48914 | 70.4 |
| 10 | −8.946 | D10 (variable) | | |
| 11 (LC) | ∞ | 1.75 | 1.51872 | 64.2 |
| 12 | ∞ | 11.95 | | | f = 5.23–14.6 mm    $F_{NO}$ = 3.25–4.64    Z = 2.80    2ω = 67.2°

Those lens surfaces with a * to the right of the surface number in Table 1 are aspheric lens surfaces, and the aspheric surface shape of those lens elements is expressed by Equation (A) above.

Table 2 below lists the values of the constants K, $A_4$, $A_6$, and $A_8$ used in Equation (A) above for each of the aspherical surfaces indicated in Table 1. An "E" in the data indicates that the number following the "E" is the exponent to the base 10. For example, "1.0E-2" represents the number $1.0 \times 10^{-2}$.

TABLE 2

| # | K | $A_4$ | $A_6$ | $A_8$ |
|---|---|---|---|---|
| 1 | 1.3300 | 0.4224E−4 | −0.5674E−6 | 0.2400E−8 |
| 2 | −0.3100 | 0.8976E−3 | 0.1153E−5 | 0.0000 |

TABLE 2-continued

| # | K | $A_4$ | $A_6$ | $A_8$ |
|---|---|---|---|---|
| 6 | 1.1900 | −0.1135E−3 | −0.7875E−6 | −0.2900E−7 |
| 7 | −2.9000 | 0.5824E−3 | 0.3645E−5 | 0.2800E−7 |

In the zoom lens of Embodiment 1, lens groups G1 and G2 move to vary their separation and the separation of lens group G2 from optical element LC also varies during zooming. Therefore, the values of the on-axis spacings D4 and D10 vary. Table 3 below lists the values of the variables D4 and D10 (i.e., the on-axis spacings) at the wide-angle end (Wide) and at the telephoto end (Tele). The focal length of the zoom lens when focused at infinity is 5.23 mm at the wide-angle end and is 14.6 mm at the telephoto end.

TABLE 3

| # | Wide | Tele |
|---|---|---|
| D4 | 26.01 | 3.36 |
| D10 | 0.00 | 9.14 |

The zoom lens of Embodiment 1 of the present invention satisfies all of Conditions (1) through (4) above as set forth in Table 4 below. The bottom portion of Table 4 recites, where necessary, the quantities that have been used to calculate the values that satisfy Conditions (1) through (4). Additionally, Table 4 included the value of the Petzval sum of the zoom lens at the wide-angle end and focused at infinity that satisfies a Condition (5) that the Petzval sum be small.

TABLE 4

| Condition No. | Condition | Value |
|---|---|---|
| (1) | 60 < f(4–5)/fw < 500 | 170.730 |
| (2) | 2.2 < f(3–5)/fw < 2.7 | 2.5531 |
| (3) | |f1/fw| < 1.74 | −1.7387 |
| (4) | |fw/R1| < 0.04 | 0.0093 |
| (5) | Small Petzval sum | 0.0126 | f(4–5) = 903.54 mm    fw = 5.237 mm    f(3–5) = 13.370 mm
f1 = −9.107    R1 = 564.0

FIGS. 2A–2D show the spherical aberration, astigmatism, distortion, and lateral color, respectively, of the zoom lens of Embodiment 1 at the wide-angle end. In FIG. 2B, the astigmatism is shown for both the sagittal image surface S and the tangential image surface T. FIGS. 3A–3D show the coma in the tangential image plane of the zoom lens of Embodiment 1 at the wide-angle end at various half-image angles ω, and FIGS. 3E–3G show the coma in the sagittal image plane of the zoom lens of Embodiment 1 at the wide-angle end at various half-image angles ω. As the coma on-axis is identical in both the tangential and sagittal image planes, only one curve is shown for ω=0°. In FIGS. 2A–2D and FIGS. 3A–3G, the symbols R, B, and G denote aberrations for red, blue, and green light, respectively. As is apparent from these figures, the various aberrations are favorably corrected.

FIGS. 4A–4D show the spherical aberration, astigmatism, distortion, and lateral color, respectively, of the zoom lens of Embodiment 1 at the telephoto end. In FIG. 4B, the astigmatism is shown for both the sagittal image surface S and the tangential image surface T. FIGS. 5A–5D show the coma in the tangential image plane of the zoom lens of Embodiment 1 at the telephoto end at various half-image angles ω, and FIGS. 5E–5G show the coma in the sagittal image plane of the zoom lens of Embodiment 1 at the telephoto end at various half-image angles ω. In FIGS. 4A–4D and FIGS. 5A–5G, the symbols R, B, and G denote aberrations for red, blue, and green light, respectively. As is apparent from these figures, the various aberrations are favorably corrected.

EMBODIMENT 2

Embodiment 2 is very similar to Embodiment 1 and differs from Embodiment 1 in its lens elements configuration only by different radii of curvature of some lens surfaces, different eccentricities and aspheric coefficients of some aspheric lens surfaces, some different optical element surface spacings, and one different Abbe number of one lens element. Therefore, Embodiment 2 is well shown by FIGS. 1A–1C.

Table 5 below lists the surface number #, in order from the object side, the radius of curvature R (in mm) of each surface near the optical axis, the on-axis surface spacing D (in mm) between surfaces, as well as the refractive index $N_e$ (at the e-line of λ=546.1 nm) and the Abbe number $v_d$ (at the d-line of 587.6 nm) of each lens element for Embodiment 2. Listed in the bottom portion of Table 5 are the focal length f, the f-number $F_{NO}$, the zoom ratio Z at the wide-angle and telephoto ends, and the maximum image angle 2ω at the wide-angle end for Embodiment 2.

TABLE 5

| # | R | D | $N_e$ | $v_d$ |
|---|---|---|---|---|
| 1* (L1) | ∞ | 1.26 | 1.51055 | 56.3 |
| 2* | 4.514 | 4.33 | | |
| 3 (L2) | 9.199 | 2.20 | 1.73430 | 28.3 |
| 4 | 13.480 | D4 (variable) | | |
| 5 (stop) | ∞ | 1.08 | | |
| 6* (L3) | 6.714 | 2.70 | 1.51055 | 56.3 |
| 7* | −75.055 | 1.54 | | |
| 8 (L4) | ∞ | 1.04 | 1.83932 | 37.1 |
| 9 (L5) | 5.800 | 3.02 | 1.48914 | 70.4 |
| 10 | −8.946 | D10 (variable) | | |
| 11 (LC) | ∞ | 1.75 | 1.51872 | 64.2 |
| 12 | ∞ | 12.45 | | | f = 5.18–14.4 mm   $F_{NO}$ = 3.31–4.73   Z = 2.80   2ω = 67.8°

Those lens surfaces with a * to the right of the surface number in Table 5 are aspheric lens surfaces, and the aspheric surface shape of those lens elements is expressed by Equation (A) above.

Table 6 below lists the values of the constants K, $A_4$, $A_6$, and $A_8$ used in Equation (A) above for each of the aspherical surfaces indicated in Table 5. An "E" in the data indicates that the number following the "E" is the exponent to the base 10. For example, "1.0E-2" represents the number $1.0 \times 10^{-2}$.

TABLE 6

| # | K | $A_4$ | $A_6$ | $A_8$ |
|---|---|---|---|---|
| 1 | 1.3300 | 0.4221E−4 | −0.5674E−6 | 0.2400E−8 |
| 2 | −0.2900 | 0.8977E−3 | 0.1153E−5 | 0.0000 |
| 6 | 1.2000 | −0.1132E−3 | −0.7875E−6 | −0.2900E−7 |
| 7 | −2.9000 | 0.5822E−3 | 0.3645E−5 | 0.2800E−7 |

In the zoom lens of Embodiment 2, lens groups G1 and G2 move to vary their separation and the separation of lens group G2 from optical element LC also varies during zooming. Therefore, the values of the on-axis spacings D4 and D10 vary. Table 7 below lists the values of the variables D4 and D10 (i.e., the on-axis spacings) at the wide-angle end (Wide) and at the telephoto end (Tele). The focal length of the zoom lens when focused at infinity is 5.18 mm at the wide-angle end and is 14.4 mm at the telephoto end.

TABLE 7

| # | Wide | Tele |
|---|---|---|
| D4 | 26.01 | 3.67 |
| D10 | 0.00 | 9.52 |

The zoom lens of Embodiment 2 of the present invention satisfies all of Conditions (1) through (4) above as set forth in Table 8 below. The bottom portion of Table 8 recites, where necessary, the quantities that have been used to calculate the values that satisfy Conditions (1) through (4). Additionally, Table 8 included the value of the Petzval sum of the zoom lens at the wide-angle end and focused at infinity that satisfies a Condition (5) that the Petzval sum be small.

TABLE 8

| Condition No. | Condition | Value |
|---|---|---|
| (1) | 60 < f(4–5)/fw < 500 | 192.100 |
| (2) | 2.2 < f(3–5)/fw < 2.7 | 2.6325 |
| (3) | |f1/fw| < 1.74 | −1.7110 |
| (4) | |fw/R1| < 0.04 | 0.0000 |
| (5) | Small Petzval sum | 0.0093 | f(4–5) = 1004.11 mm   fw = 5.189 mm   f(3–5) = 13.601 mm
f1 = −8.841   R1 = ∞

FIGS. 6A–6D show the spherical aberration, astigmatism, distortion, and lateral color, respectively, of the zoom lens of Embodiment 2 at the wide-angle end. In FIG. 6B, the astigmatism is shown for both the sagittal image surface S and the tangential image surface T. FIGS. 7A–7D show the coma in the tangential image plane of the zoom lens of Embodiment 2 at the wide-angle end at various half-image angles ω, and FIGS. 7E–7G show the coma in the sagittal image plane of the zoom lens of Embodiment 2 at the wide-angle end at various half-image angles ω. In FIGS. 6A–6D and FIGS. 7A–7G, the symbols R, B, and G denote aberrations for red, blue, and green light, respectively. As is apparent from these figures, the various aberrations are favorably corrected.

Figure 9A:
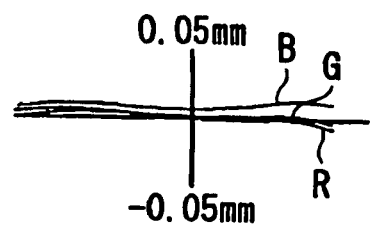
FIGS. 9A–9D show the coma at various field angles in the tangential plane.
Figure 9B:
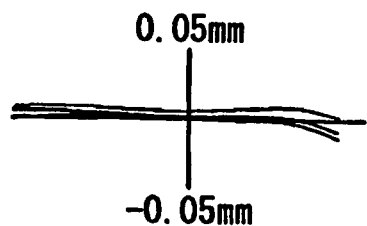
Figure 9C:
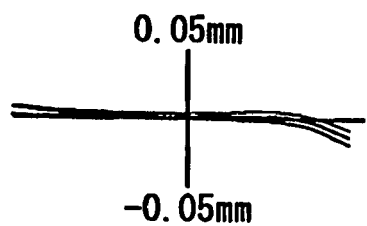
Figure 9D:
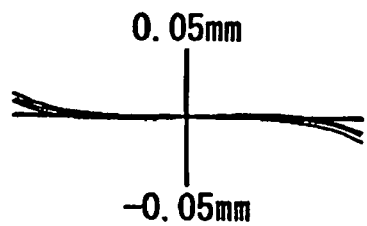
Figure 9E:
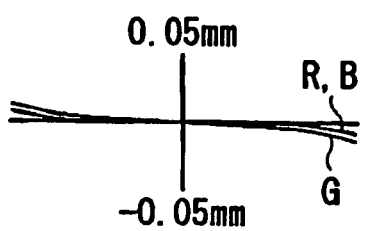
FIGS. 9E–9G show the coma at various field angles in the sagittal plane, of the zoom lens according to Embodiment 2 at the telephoto end.
Figure 9F:
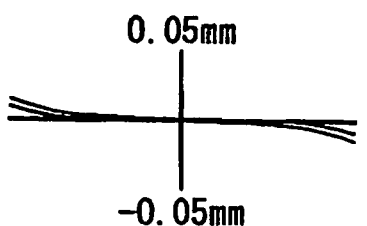
Figure 9G:
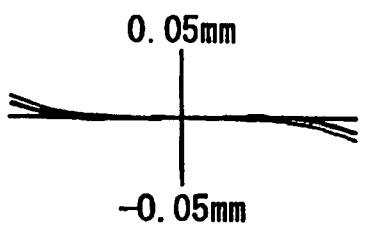

FIGS. 8A–8D show the spherical aberration, astigmatism, distortion, and lateral color, respectively, of the zoom lens of Embodiment 2 at the telephoto end. In FIG. 8B, the astigmatism is shown for both the sagittal image surface S and the tangential image surface T. FIGS. 9A–9D show the coma in the tangential image plane of the zoom lens of Embodiment 2 at the telephoto end at various half-image angles ω, and FIGS. 9E–9G show the coma in the sagittal image plane of the zoom lens of Embodiment 2 at the telephoto end at various half-image angles ω. In FIGS. 8A–8D and FIGS. 9A–9G, the symbols R, B, and G denote aberrations for red, blue, and green light, respectively. As is apparent from these figures, the various aberrations are favorably corrected.

EMBODIMENT 3

Embodiment 3 is very similar to Embodiment 1 and differs from Embodiment 1 in its lens elements configuration only by different radii of curvature of some lens surfaces, different eccentricities and aspheric coefficients of some aspheric lens surfaces, some different optical element surface spacings, and one different Abbe number of one lens element. Therefore, Embodiment 3 is well shown by FIGS. 1A–1C.

Table 9 below lists the surface number #, in order from the object side, the radius of curvature R (in mm) of each surface near the optical axis, the on-axis surface spacing D (in mm) between surfaces, as well as the refractive index $N_e$ (at the e-line of $\lambda$=546.1 nm) and the Abbe number $v_d$ (at the d-line of 587.6 nm) of each lens element for Embodiment 3. Listed in the bottom portion of Table 9 are the focal length f, the f-number $F_{NO}$, the zoom ratio Z at the wide-angle and telephoto ends, and the maximum image angle 2ω at the wide-angle end for Embodiment 3.

TABLE 9

| # | R | D | $N_e$ | $v_d$ |
|---|---|---|---|---|
| 1* (L1) | −2537.505 | 1.26 | 1.51055 | 56.3 |
| 2* | 4.514 | 4.32 | | |
| 3 (L2) | 9.204 | 2.20 | 1.73430 | 28.3 |
| 4 | 13.458 | D4 (variable) | | |
| 5 (stop) | ∞ | 1.18 | | |
| 6* (L3) | 6.714 | 2.62 | 1.51055 | 56.3 |
| 7* | −75.055 | 0.95 | | |
| 8 (L4) | ∞ | 1.68 | 1.83932 | 37.1 |
| 9 (L5) | 5.774 | 3.02 | 1.48914 | 70.4 |
| 10 | −8.934 | D10 (variable) | | |
| 11 (LC) | ∞ | 1.35 | 1.51872 | 64.2 |
| 12 | ∞ | 12.75 | | | f = 5.18–14.5 mm  $F_{NO}$ = 3.44–5.09  Z = 2.80  2ω = 67.8°

Those lens surfaces with a * to the right of the surface number in Table 9 are aspheric lens surfaces, and the aspheric surface shape of those lens elements is expressed by Equation (A) above.

Table 10 below lists the values of the constants K, $A_4$, $A_6$, $A_8$, and $A_{10}$ used in Equation (A) above for each of the aspherical surfaces indicated in Table 9. An "E" in the data indicates that the number following the "E" is the exponent to the base 10. For example, "1.0E-2" represents the number $1.0 \times 10^{-2}$.

TABLE 10

| # | K | $A_4$ | $A_6$ | $A_8$ | $A_{10}$ |
|---|---|---|---|---|---|
| 1 | 1.3306 | 0.4228E−4 | −0.5674E−6 | 0.2262E−8 | 0.1609E−11 |
| 2 | −0.2909 | 0.8977E−3 | 0.1153E−5 | 0.1388E−9 | 0.7917E−14 |
| 6 | 1.2080 | −0.1132E−3 | −0.7875E−6 | −0.2913E−7 | 0.2369E−9 |
| 7 | −2.9044 | 0.5822E−3 | 0.3645E−5 | 0.2800E−7 | 0.3842E−9 |

In the zoom lens of Embodiment 3, lens groups G1 and G2 move to vary their separation and the separation of lens group G2 from optical element LC also varies during zooming. Therefore, the values of the on-axis spacings D4 and D10 vary. Table 11 below lists the values of the variables D4 and D10 (i.e., the on-axis spacings) at the wide-angle end (Wide) and at the telephoto end (Tele). The focal length of the zoom lens when focused at infinity is 5.18 mm at the wide-angle end and 14.5 mm at the telephoto end.

TABLE 11

| # | Wide | Tele |
|---|---|---|
| D4 | 25.91 | 3.51 |
| D10 | 0.00 | 9.58 |

The zoom lens of Embodiment 3 of the present invention satisfies all of Conditions (1) through (4) above as set forth in Table 12 below. The bottom portion of Table 12 recites, where necessary, the quantities that have been used to calculate the values that satisfy Conditions (1) through (4). Additionally, Table 12 includes the value of the Petzval sum of the zoom lens at the wide-angle end when focused at infinity that satisfies a Condition (5) that the Petzval sum be small.

TABLE 12

| Condition No. | Condition | Value |
|---|---|---|
| (1) | 60 < f(4–5)/fw < 500 | 229.742 |
| (2) | 2.2 < f(3–5)/fw < 2.7 | 2.6264 |
| (3) | |f1/fw| < 1.74 | −1.7020 |
| (4) | |fw/R1| < 0.04 | 0.0020 |
| (5) | Small Petzval sum | 0.0090 | f(4–5) = 1195.24 mm   fw = 5.185 mm   f(3–5) = 13.615 mm
f1 = −8.824   R1 = −2537.505

FIGS. 10A–10D show the spherical aberration, astigmatism, distortion, and lateral color, respectively, of the zoom lens of Embodiment 3 at the wide-angle end. In FIG. 10B, the astigmatism is shown for both the sagittal image surface S and the tangential image surface T. FIGS. 11A–11D show the coma in the tangential image plane of the zoom lens of Embodiment 3 at the wide-angle end at various half-image angles ω, and FIGS. 11E–11G show the coma in the sagittal image plane of the zoom lens of Embodiment 3 at the wide-angle end at various half-image angles ω. In FIGS. 10A–10D and FIGS. 11A–11G, the symbols R, B, and G denote aberrations for red, blue, and green light, respectively. As is apparent from these figures, the various aberrations are favorably corrected.

FIGS. 12A–12D show the spherical aberration, astigmatism, distortion, and lateral color, respectively, of the zoom lens of Embodiment 3 at the telephoto end. In FIG. 12B, the astigmatism is shown for both the sagittal image surface S and the tangential image surface T. FIGS. 13A–13D show the coma in the tangential image plane of the zoom lens of Embodiment 3 at the telephoto end at various half-image angles ω, and FIGS. 13E–13G show the coma in the sagittal image plane of the zoom lens of Embodiment 3 at the telephoto end at various half-image angles ω. In FIGS. 12A–12D and FIGS. 13A–13G, the symbols R, B, and G denote aberrations for red, blue, and green light, respectively. As is apparent from these figures, the various aberrations are favorably corrected.

EMBODIMENT 4

Figure 14A:
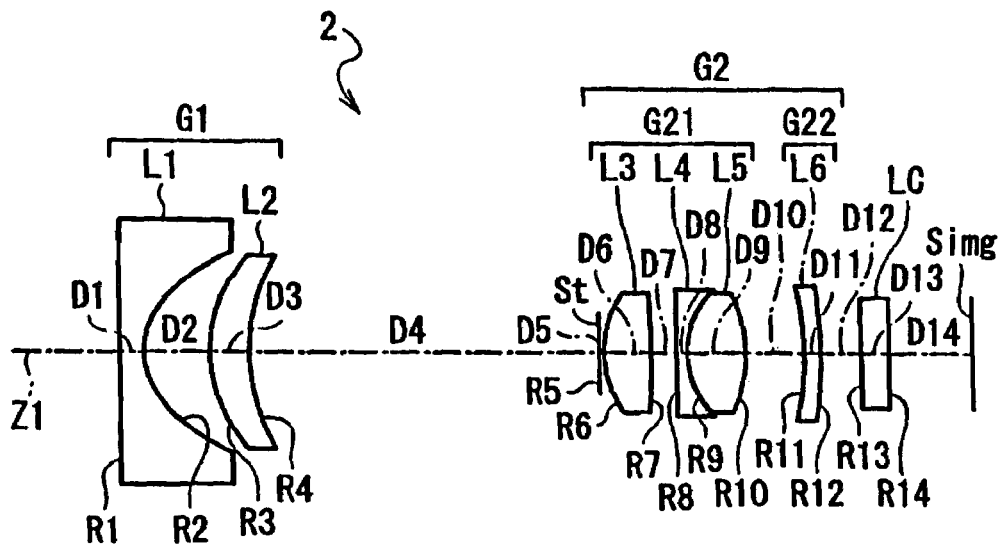
FIGS. 14A, 14B, and 14C show cross-sectional views of Embodiment 4 of the zoom lens of the present invention at the wide-angle end, at an intermediate position, and at the telephoto end, respectively.
Figure 14B:
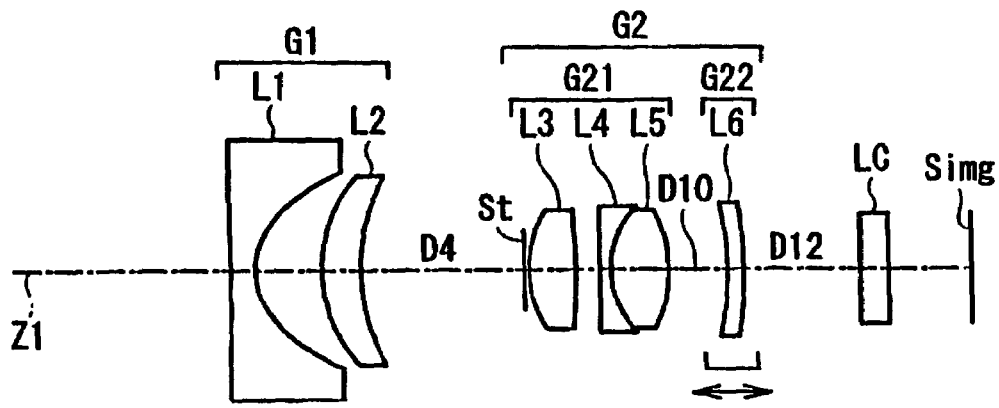
Figure 14C:
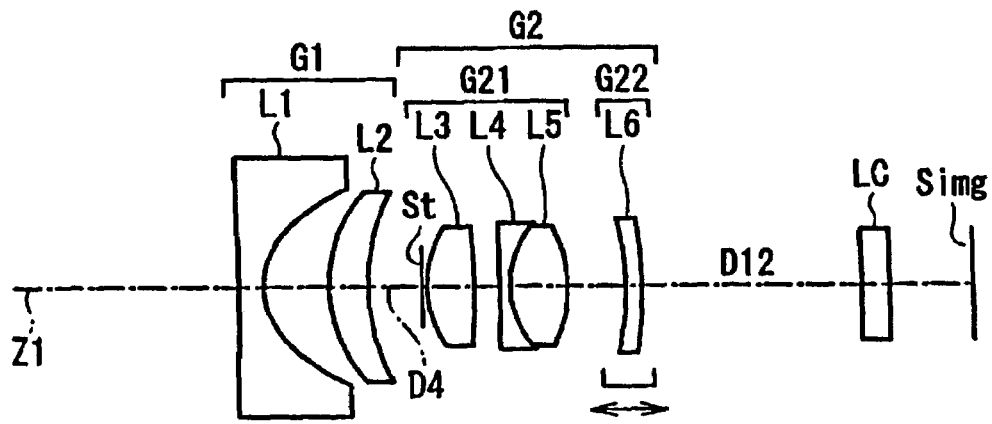

FIGS. 14A–14C show the basic lens element configurations of a zoom lens of Embodiment 4 of the present invention at the wide-angle end, at an intermediate position, and at the telephoto end, respectively. The same basic lens element configurations are used in the zoom lenses of Embodiments 4 and 5 of the present invention.

Embodiment 4 is similar to Embodiment 1 but differs from Embodiment 1 in its lens element configuration by, for example, having different radii of curvature of the lens surfaces, different eccentricities and aspheric coefficients of the aspheric lens surfaces, different optical element surface spacings, and one different Abbe number of the lens elements corresponding to the lens elements of Embodiment 1. However, the zoom lens 2 of Embodiment 4 includes a sixth lens element L6 that is a negative lens element that is movable for focusing of the zoom lens, so that the zoom lens 2 of Embodiment 4 is an inner-focus-type zoom lens, unlike previous Embodiments 1–3 that were designed for front focus.

Additionally, the zoom lens of Embodiment 4 is preferably designed to satisfy conditions that may be different from Conditions (2)–(4) discussed previously with regard to Embodiments 1–3. The new conditions, Conditions (6)–(8), will be discussed later, as will be Embodiment 5 that also is preferably designed to satisfy Conditions (6)–(8).

The zoom lens 2 according to the embodiment shown in FIGS. 14A–14C is suitable for use in small imaging devices, such as digital cameras. The zoom lens 2 includes, in order from the object side, a first lens group G1 and a second lens group G2 along the optical axis Z1. An imaging element (not shown), such as a CCD or CMOS, is positioned on the image plane Simg of the zoom lens 2. A cover glass (not shown) for protecting the image plane and one or more optical elements denoted by LC in FIGS. 14A–14C, such as a low-pass filter, are provided between the second lens group G2 and the image plane Simg.

The first lens group G1 and part of the second lens group G2 of the zoom lens 2 move along the optical axis for zooming. The zoom lens 2 is of the inner-focus-type. The sixth lens element L6 of the second lens group G2 moves along the optical axis for focusing according to the change in object distance.

The first lens group G1 includes, in order from the object side, a first lens element L1 and a second lens element L2. The second lens group G2 includes, in order from the object side, a diaphragm that may serve as an aperture stop St, a third lens element L3, a fourth lens element L4, a fifth lens element L5, and a sixth lens element L6 that is used for inner focusing of the zoom lens 2.

In lens group G1, the first lens element L1 is a negative lens element made of plastic with two aspheric lens surfaces and with a concave lens surface on its image side. The first lens element L1 is also the first lens component, from the object side, of the zoom lens. The second lens element L2 is a positive meniscus lens element with a convex lens surface on its object side. The second lens element L2 is also the second lens component, from the object side, of the zoom lens.

The second lens group G2 includes two lens groups, G21 and G22, in that order from the object side, that may move relative to one another. Lens group G21 includes the third lens element L3 that is a biconvex lens element and made of plastic with two aspheric lens surfaces, the fourth lens element L4 that is a negative lens element with a concave lens surface on its image side, and the fifth lens element L5 that is a biconvex lens and forms a doublet together with the fourth lens L4. Thus the third lens element L3 is also the third lens component, from the object side, of the zoom lens, and the fourth lens element L4 and the fifth lens element L5 together form the fourth lens component, from the object side, of the zoom lens. The sixth lens element L6 forms the lens group G22 that is movable relative to lens group G21, as well as relative to the first lens group G1 and the optical element LC, during zooming, as well as being movable to provide inner focusing. The sixth lens element L6 is the fifth lens component, from the object side, of the zoom lens.

Preferably, both lens surfaces of both of the first and third lens elements L1 and L3 are aspheric lens surfaces. Preferably also, the absolute value of the radius of curvature of the lens surface of the fourth lens element L4 that is on the object side is smaller than the absolute value of the radius of curvature of the lens surface of the fourth lens element L4 that is on the image side, and, with this configuration, preferably the first and third lens elements include a total of at least three aspheric lens surfaces of their four total lens surfaces. Preferably also, the first lens element L1 and the sixth lens element L6 have concave lens surfaces on their object sides.

Further, preferably the following condition is satisfied:

$$-25 < f6/fw < -15 \qquad \text{Condition (6)}$$

where f6 is the focal length of the sixth lens element L6 of the zoom lens, and fw is the focal length of the zoom lens at the wide-angle end.

By satisfying Condition (6), an appropriate movement of the sixth lens element L6 as the focusing lens is achieved. The focusing lens element preferably has a small movement in order to reduce the total length of the zoom lens. On the other hand, the focusing lens element preferably has a large movement in order to improve the focusing precision. When Condition (6) is satisfied, the focusing lens element has a small enough total movement to reduce the total length of the zoom lens but large enough total movement to allow improved precision in focusing. If the above ratio of Condition (6) is smaller than the lower limit of Condition (6), the focusing lens element has such strong power that focus varies too quickly with movement of the focusing lens, thereby lowering focusing precision. If the above ratio of Condition (6) is larger than the upper limit of Condition (6), the focusing lens element has such weak power that the focusing lens element has to move a long way along the optical axis to focus the zoom lens, thereby making the zoom lens too long.

Additionally, preferably the following condition is satisfied:

$$-0.04 < fw/R1 < 0 \qquad \text{Condition (7)}$$

where, as previously defined, fw is the focal length of the zoom lens at the wide-angle end, and RI is the radius of curvature of the object-side lens surface of said first lens component.

Condition (7) defines an appropriate profile of the object side lens surface of the first lens element L1 that is a plastic lens element. In the production of a plastic lens element, a precise profile can be consistently obtained through molding when the ratio of the thickness of the lens element at its center to the thickness of the lens element at its edge is small. Therefore, it is disadvantageous to accurate molding of the first lens L1 that is a negative lens element to make the object side lens surface of the first lens element L1 convex.

Additionally, plastic lens elements are more easily damaged than glass lens elements. When the first lens element L1 that is the closest to the object being imaged is a plastic lens, it may be easily damaged by being dropped or otherwise contacting some object. If contact occurs, the first lens element L1 may be damaged. If the first lens element L1 is convex on the object side, which is the situation when the above ratio of Condition (7) becomes larger than the upper limit of Condition (7), the lens element L1 can be easily damaged. Additionally, when the object side surface of the first lens element L1 is convex, the first lens element L1 must still be a strong negative lens element, which causes problems to develop.

Further, preferably the following condition is satisfied:

$$1.7 < f3/fw < 2.2 \qquad \text{Condition (8)}$$

where f3 is the focal length of the third lens element L3 of the zoom lens, and fw is as previously defined.

Satisfying Condition (8) assists in various aberrations being well corrected, mainly distortion, field curvature at the wide-angle end, and spherical aberration at the telephoto end.

The zoom lens 2 has an advantageous configuration of inner focusing. Inner focusing usually is employed with no manual focusing, and inner focusing helps reduce the total length of the zoom lens. The primary point arrangement held by L1 and L6 which comprise the negative first and sixth lens elements positioned at both ends of the zoom lens makes it possible to reduce the overall length of the lens.

The presence of the sixth negative lens element L6 as the lens element closest to the image, in the second lens group G2, reduces the back focus of the zoom lens and, accordingly, reduces the entire length of the zoom lens. The second lens group G2, behind the aperture stop St compensates for the positive Petzval sum and negative distortion contributions of the first lens group G1. With the sixth lens element L6 present, the placement of the second lens group G2 of positive refractive power behind the aperture stop St results in a small Petzval sum and little distortion of the entire zoom lens.

For focusing, only the negative sixth lens element L6 is moved along the optical axis. This reduces fluctuations in aberrations associated with focusing as compared with a front-focusing lens group in which the front lens group is integrally moved. This is particularly obvious when the inner-focusing lens, (i.e., the sixth lens element L6), has small refractive power. Unlike with front focusing, with inner focusing, the front lens group (i.e., the first lens group G1), does not move for focusing. Therefore, there is no need to increase the lens diameters of the front lens elements in order to ensure that rim rays properly pass through the zoom lens when the zoom lens is focused at short distances.

Inner focusing reduces the total weight of lens elements that move during focusing compared to front focusing arrangements that include a glass lens element that moves for focusing. This reduces the load on the lens driving mechanism, which allows the use of a small lens driving mechanism and facilitates storage of the lens driving mechanism in the lens barrel, for example, near the second lens group G2.

The zoom lens 2 adjusts the distance between the negative sixth lens element L6 that moves for focusing and the fifth lens element L5, which is located on the object side of the sixth lens element L6, so that the exit pupil is properly positioned. This prevents the total length of the lens from becoming too large.

Table 13 below lists the surface number #, in order from the object side, the radius of curvature R (in mm) of each surface near the optical axis, the on-axis surface spacing D (in mm) between surfaces, as well as the refractive index $N_e$ (at the e-line of $\lambda$=546.1 nm) and the Abbe number $v_d$ (at the d-line of 587.6 nm) of each lens element for Embodiment 4. Listed in the bottom portion of Table 13 are the focal length f, the f-number $F_{NO}$, the zoom ratio Z at the wide-angle and telephoto ends, and the maximum image angle 2ω at the wide-angle end for Embodiment 4.

TABLE 13

| # | R | D | $N_e$ | $v_d$ |
|---|---|---|---|---|
| 1* (L1) | −151.448 | 1.50 | 1.51080 | 55.9 |
| 2* | 4.600 | 4.03 | | |
| 3 (L2) | 9.140 | 2.40 | 1.76859 | 26.5 |
| 4 | 12.680 | D4 (variable) | | |
| 5 (stop) | ∞ | 0.30 | | |
| 6* (L3) | 6.730 | 2.96 | 1.51080 | 55.9 |
| 7* | −24.971 | 1.54 | | |
| 8 (L4) | −123.909 | 0.65 | 1.83932 | 37.1 |
| 9 (L5) | 5.738 | 3.61 | 1.48914 | 70.4 |
| 10 | −8.311 | D10 (variable) | | |
| 11 (L6) | −17.466 | 1.00 | 1.51080 | 55.9 |
| 12 | −26.634 | D12 (variable) | | |
| 13 (LC) | ∞ | 1.75 | 1.51872 | 64.2 |
| 14 | ∞ | 5.22 | | |
| f = 5.7–16.5 mm | $F_{NO}$ = 3.66–5.59 | Z = 2.90 | 2ω = 67.8° | |

Those lens surfaces with a * to the right of the surface number in Table 13 are aspheric lens surfaces, and the aspheric surface shape of those lens elements is expressed by Equation (A) above.

Table 14 below lists the values of the constants K, $A_4$, $A_6$, and $A_8$ used in Equation (A) above for each of the aspherical surfaces indicated in Table 13. An "E" in the data indicates that the number following the "E" is the exponent to the base 10. For example, "1.0E-2" represents the number $1.0 \times 10^{-2}$.

TABLE 14

| # | K | $A_4$ | $A_6$ | $A_8$ |
|---|---|---|---|---|
| 1 | 24.0800 | 0.6723E−4 | −0.6763E−6 | 0.2231E−8 |
| 2 | −0.3180 | 0.9576E−3 | 0.1184E−5 | 0.1400E−9 |
| 6 | 1.3470 | −0.2020E−3 | −0.6510E−6 | −0.2562E−7 |
| 7 | −26.0185 | 0.4986E−3 | 0.3293E−5 | 0.2462E−7 |

In the zoom lens of Embodiment 4, the lens groups G1, G21, and G22 move to vary their separations and the separation of the lens group G22 from the optical element LC also varies during zooming. Therefore, the values of the on-axis spacings D4, D10, and D12 vary. Table 15 below lists the values of the variables D4, D10 and D12 (i.e., the on-axis spacings) at the wide-angle end (Wide) and at the telephoto end (Tele). The focal length of the zoom lens when focused at infinity is 5.7 mm at the wide-angle end and is 16.5 mm at the telephoto end.

TABLE 15

| # | Wide | Tele |
|---|---|---|
| D4 | 21.63 | 3.34 |
| D10 | 3.63 | 3.64 |
| D12 | 2.50 | 13.36 |

The zoom lens of Embodiment 4 of the present invention satisfies all of Conditions (5) through (8) above as set forth in Table 16 below. The bottom portion of Table 16 recites, where necessary, the quantities that have been used to calculate the values that satisfy Conditions (5) through (8). Table 16 includes the value of the Petzval sum of the zoom lens at the wide-angle end when focused at infinity that satisfies Condition (5) that the Petzval sum be small.

TABLE 16

| Condition No. | Condition | Value |
|---|---|---|
| (5) | Small Petzval Sum | 0.0082 |
| (6) | −25 < f6/fw < −15 | −17.910 |

TABLE 16-continued

| Condition No. | Condition | Value |
|---|---|---|
| (7) | −0.04 < fw/R1 < 0 | −0.0380 |
| (8) | 1.7 < f3/fw < 2.2 | 1.861 |
| f6 = −103.14 mm | fw = 5.760 mm    R1 = −151.448 mm | |
| | f3 = 10.717 | |

FIGS. 15A–15D show the spherical aberration, astigmatism, distortion, and lateral color, respectively, of the zoom lens of Embodiment 4 at the wide-angle end. In FIG. 15B, the astigmatism is shown for both the sagittal image surface S and the tangential image surface T. FIGS. 16A–16D show the coma in the tangential image plane of the zoom lens of Embodiment 4 at the wide-angle end at various half-image angles ω, and FIGS. 16E–16G show the coma in the sagittal image plane of the zoom lens of Embodiment 4 at the wide-angle end at various half-image angles ω. In FIGS. 15A–15D and FIGS. 16A–16G, the symbols R, B, and G denote aberrations for red, blue, and green light, respectively. As is apparent from these figures, the various aberrations are favorably corrected.

FIGS. 17A–17D show the spherical aberration, astigmatism, distortion, and lateral color, respectively, of the zoom lens of Embodiment 4 at the telephoto end. In FIG. 17B, the astigmatism is shown for both the sagittal image surface S and the tangential image surface T. FIGS. 18A–18D show the coma in the tangential plane of the zoom lens of Embodiment 4 at the telephoto end at various half-image angles ω, and FIGS. 18E–18G show the coma in the sagittal plane of the zoom lens of Embodiment 4 at the telephoto end at various half-image angles ω. In FIGS. 17A–17D and FIGS. 18A–18G, the symbols R, B, and G denote aberrations for red, blue, and green light, respectively. As is apparent from these figures, the various aberrations are favorably corrected.

EMBODIMENT 5

Embodiment 5 is very similar to Embodiment 4 and differs from Embodiment 4 in its lens element configuration by, for example, having different radii of curvature of the lens surfaces, different eccentricities and aspheric coefficients of the aspheric lens surfaces, different optical element surface spacings, and some different Abbe numbers of the lens elements. Therefore, Embodiment 5 is well shown by FIGS. 14A–14C.

Table 17 below lists the surface number #, in order from the object side, the radius of curvature R (in mm) of each surface near the optical axis, the on-axis surface spacing D (in mm) between surfaces, as well as the refractive index $N_e$ (at the e-line of λ=546.1 nm) and the Abbe number $v_d$ (at the d-line of 587.6 nm) of each lens element for Embodiment 5. Listed in the bottom portion of Table 17 are the focal length f, the f-number $F_{NO}$, the zoom ratio Z at the wide-angle and telephoto ends, and the maximum image angle 2ω at the wide-angle end for Embodiment 5.

TABLE 17

| # | R | D | $N_e$ | $v_d$ |
|---|---|---|---|---|
| 1* (L1) | −356.532 | 1.27 | 1.51063 | 56.4 |
| 2* | 4.470 | 4.40 | | |
| 3 (L2) | 9.123 | 2.64 | 1.74707 | 27.7 |
| 4 | 12.680 | D4 (variable) | | |

TABLE 17-continued

| # | R | D | $N_e$ | $v_d$ |
|---|---|---|---|---|
| 5 (stop) | ∞ | 1.27 | | |
| 6* (L3) | 6.936 | 2.96 | 1.51063 | 56.4 |
| 7* | −20.879 | 1.59 | | |
| 8 (L4) | −124.274 | 1.06 | 1.83932 | 37.1 |
| 9 (L5) | 5.744 | 3.08 | 1.48914 | 70.4 |
| 10 | −8.340 | D10 (variable) | | |
| 11 (L6) | −18.179 | 1.06 | 1.49227 | 57.5 |
| 12 | −27.154 | D12 (variable) | | |
| 13 (LC) | ∞ | 1.30 | 1.51872 | 64.2 |
| 14 | ∞ | 2.19 | | |
| f = 5.1–14.2 mm    $F_{NO}$ = 3.5–5.1    Z = 2.80    2ω = 73.0° | | | | |

Those lens surfaces with a * to the right of the surface number in Table 17 are aspheric lens surfaces, and the aspheric surface shape of those lens elements is expressed by Equation (A) above.

Table 18 below lists the values of the constants K, $A_4$, $A_6$, $A_8$, and $A_{10}$ used in Equation (A) above for each of the aspherical surfaces indicated in Table 17. An "E" in the data indicates that the number following the "E" is the exponent to the base 10. For example, "1.0E-2" represents the number $1.0\times10^{-2}$.

TABLE 18

| # | K | $A_4$ | $A_6$ | $A_8$ | $A_{10}$ |
|---|---|---|---|---|---|
| 1 | 1.3285 | 0.6666E−4 | −0.6760E−6 | 0.2231E−8 | 0.1543E−11 |
| 2 | −0.4108 | 0.1131E−2 | 0.1185E−5 | 0.1400E−9 | 0.8257E−14 |
| 6 | 1.2904 | −0.2589E−3 | −0.6511E−6 | −0.2562E−7 | 0.2008E−9 |
| 7 | −3.1702 | 0.4890E−3 | 0.3293E−5 | 0.2462E−7 | 0.3257E−9 |

In the zoom lens of Embodiment 5, the lens groups G1, G21, and G22 move to vary their separations and the separation of the lens group G22 from the optical element LC also varies during zooming. Therefore, the values of the on-axis spacings D4, D10, and D12 vary. Table 19 below lists the values of the variables D4, D10 and D12 (i.e., the on-axis spacings) at the wide-angle end (Wide) and at the telephoto end (Tele). The focal length of the zoom lens when focused at infinity is 5.1 mm at the wide-angle end and is 14.2 mm at the telephoto end.

TABLE 19

| # | Wide | Tele |
|---|---|---|
| D4 | 23.10 | 2.86 |
| D10 | 1.54 | 1.54 |
| D12 | 7.05 | 16.56 |

The zoom lens of Embodiment 5 of the present invention satisfies all of Conditions (5) through (8) above as set forth in Table 20 below. The bottom portion of Table 20 recites, where necessary, the quantities that have been used to calculate the values that satisfy Conditions (5) through (8). Table 20 includes the value of the Petzval sum of the zoom lens at the wide-angle end and focused at infinity that satisfies Condition (5) that the Petzval sum be small.

TABLE 20

| Condition No. | Condition | Value |
|---|---|---|
| (5) | Small Petzval sum | 0.0090 |
| (6) | −25 < f6/fw < −15 | −22.807 |

TABLE 20-continued

| Condition No. | Condition | Value |
|---|---|---|
| (7) | −0.04 < fw/R1 < 0 | −0.0143 |
| (8) | 1.7 < f3/fw < 2.2 | 2.075 |
| f6 = −116.17 mm | fw = 5.097 mm     R1 = −356.532 mm | |
| | f3 = 10.577 | |

FIGS. 19A–19D show the spherical aberration, astigmatism, distortion, and lateral color, respectively, of the zoom lens of Embodiment 5 at the wide-angle end. In FIG. 19B, the astigmatism is shown for both the sagittal image surface S and the tangential image surface T. FIGS. 20A–20D show the coma in the tangential image plane of the zoom lens of Embodiment 5 at the wide-angle end at various half-image angles ω, and FIGS. 20E–20G show the coma in the sagittal image plane of the zoom lens of Embodiment 5 at the wide-angle end at various half-image angles ω. In FIGS. 19A–19D and FIGS. 20A–20G, the symbols R, B, and G denote aberrations for red, blue, and green light, respectively. As is apparent from these figures, the various aberrations are favorably corrected.

FIGS. 21A–21D show the spherical aberration, astigmatism, distortion, and lateral color, respectively, of the zoom lens of Embodiment 5 at the telephoto end. In FIG. 21B, the astigmatism is shown for both the sagittal image surface S and the tangential image surface T. FIGS. 22A–22D show the coma in the tangential image plane of the zoom lens of Embodiment 5 at the telephoto end at various half-image angles ω, and FIGS. 22E–22G show the coma in the sagittal image plane of the zoom lens of Embodiment 5 at the telephoto end at various half-image angles ω. In FIGS. 21A–21D and FIGS. 22A–22G, the symbols R, B, and G denote aberrations for red, blue, and green light, respectively. As is apparent from these figures, the various aberrations are favorably corrected.

The invention being thus described, it will be obvious that the same may be varied in many ways. For instance, values such as the radii of curvature R of the lens elements, the surface spacings D, the refractive indexes $N_e$, as well as the Abbe numbers $v_d$, are not limited to the examples indicated in each of the aforementioned embodiments, as other values can be adopted. Also, the number of lens elements and the particular lens elements that include aspheric surfaces, as well as the particular lens surfaces chosen to be aspheric may be varied. For example, although in the preferred embodiments of the invention, both lens elements with aspheric surfaces include aspheric surfaces on both of their lens surfaces, either or both of these lens elements may include only an aspheric lens surface on one of their lens surfaces. Also, lens elements that act as lens components may variously be modified as lens components that include more than one lens element. For example, one or more of the lens elements that includes an aspheric lens surface may be formed as a thin plastic lens element with one aspheric lens surface and one spherical lens surface that is bonded to a spherical surface of a lens element of a different lens material, such as glass, to form a lens component that includes two lens elements.

Additionally, although in the preferred embodiments of the invention, the third lens element is a biconvex lens element, this feature may be varied. Additionally, the number of lens elements and the particular lens elements that are made of plastic may also be varied. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

The invention claimed is:

1. A zoom lens formed of only two lens groups, in order from the object side, as follows:
    a first lens group; and
    a second lens group;
wherein
    the first lens group includes, in order from the object side, a first lens component of negative refractive power that includes a negative plastic lens element having at least one aspheric lens surface, and a second lens component of positive refractive power;
    the second lens group includes, in order from the object side and without any intervening lens elements, a diaphragm for controlling the light that passes through the zoom lens, a third lens component of positive refractive power that includes a convex lens surface on its object side and that includes a positive plastic lens element having at least one aspheric lens surface, a fourth lens component that includes only two lens elements that are, in order from the object side, a fourth lens element of negative refractive power and a fifth lens element that, together, form a lens component doublet, and a fifth lens component that is a negative lens component; and
    the first lens group and at least part of the second lens group are movable along the optical axis for zooming, and said fifth lens component is movable along the optical axis for focusing independent of movement of the other lens components of said second lens group.

2. The zoom lens of claim 1, wherein said first lens component consists of said negative plastic lens element and both lens surfaces of the said negative plastic lens element are aspheric lens surfaces, and said third lens component consists of said positive plastic lens element and both lens surfaces of said positive plastic lens element are aspheric.

3. The zoom lens of claim 1, wherein the following conditions are satisfied:

$-25 < f6/fw < -15$ $-0.04 < fw/R1 < 0$ where
    f6 is the focal length of said fifth lens component;
    fw is the focal length of the zoom lens at the wide-angle end; and
    R1 is the radius of curvature of the object-side lens surface of said first lens component.

4. The zoom lens of claim 2, wherein the following conditions are satisfied:

$-25 < f6/fw < -15$ $-0.04 < fw/R1 < 0$ where
    f6 is the focal length of said fifth lens component;
    fw is the focal length of the zoom lens at the wide-angle end; and
    R1 is the radius of curvature of the object-side lens surface of said first lens component.

5. The zoom lens of claim 3, wherein the following condition is satisfied:

$$1.7 \leq f3/fw < 2.2$$

where
f3 is the focal length of said third lens component.

6. The zoom lens of claim 4, wherein the following condition is satisfied:

$$1.7 \leq f3/fw < 2.2$$

where
f3 is the focal length of said third lens component.

7. The zoom lens of claim 1, wherein:
the absolute value of the radius of curvature of the lens surface on the object side of said fourth lens element is smaller than the absolute value of the radius of curvature of the lens surface on the image side of said fourth lens element; and
said fifth lens element is a biconvex lens element.

8. The zoom lens of claim 7, wherein said first lens component and said third lens component together include at least three aspheric lens surfaces.

9. The zoom lens of claim 1, wherein the zoom lens includes only five lens components.

10. The zoom lens of claim 9, wherein the zoom lens includes only six lens elements.

* * * * *

UNITED STATES PATENT AND TRADEMARK OFFICE
CERTIFICATE OF CORRECTION

PATENT NO. : 7,085,068 B2  Page 1 of 1
APPLICATION NO. : 10/933316
DATED : August 1, 2006
INVENTOR(S) : Takayuki Noda It is certified that error appears in the above-identified patent and that said Letters Patent is hereby corrected as shown below:

Column 8, line 30
change "included" to -- includes --;

Column 10, line 17
change "included" to -- includes -- ; and

Column 19, line 17
change "angles co" to -- angles $\omega$ --.

Signed and Sealed this

Twenty-eighth Day of November, 2006

JON W. DUDAS
*Director of the United States Patent and Trademark Office*